(12) United States Patent
Kim et al.

(10) Patent No.: US 6,826,524 B1
(45) Date of Patent: Nov. 30, 2004

(54) SAMPLE-ADAPTIVE PRODUCT QUANTIZATION

(75) Inventors: Dong Sik Kim, Sungnam-Si (KR); Ness B. Shroff, Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 654 days.

(21) Appl. No.: 09/612,579

(22) Filed: Jul. 7, 2000

Related U.S. Application Data

(63) Continuation of application No. PCT/US99/00436, filed on Jan. 8, 1999.
(60) Provisional application No. 60/070,730, filed on Jan. 8, 1998.

(51) Int. Cl.$^7$ .............................................. G10L 11/00
(52) U.S. Cl. ........................................................ 704/200
(58) Field of Search ................................ 704/220–223; 375/240.14; 382/253

(56) References Cited

U.S. PATENT DOCUMENTS

| | | | |
|---|---|---|---|
| 4,386,366 A | 5/1983 | Mori | 358/135 |
| 4,437,087 A | 3/1984 | Petr | 340/347 |
| 4,811,265 A | 3/1989 | Hashimoto et al. | 364/730 |
| 5,159,611 A | 10/1992 | Tomita et al. | 375/34 |
| 5,204,899 A | 4/1993 | Israelsen et al. | 380/14 |
| 5,265,190 A | 11/1993 | Yip et al. | 395/2.28 |
| 5,297,170 A | 3/1994 | Eyuboglu et al. | 375/25 |
| 5,398,069 A | 3/1995 | Huang et al. | 348/422 |
| 5,524,170 A | 6/1996 | Matsuo et al. | 395/2.31 |
| 5,592,227 A | 1/1997 | Feng | 348/414 |
| 5,675,385 A | 10/1997 | Sugiyama | 348/405 |
| 5,675,702 A | 10/1997 | Gerson et al. | 395/2.32 |
| 5,692,100 A | 11/1997 | Tsuboka et al. | 395/2.31 |
| 5,745,504 A | 4/1998 | Bangng | 371/37.1 |
| 5,799,110 A | * 8/1998 | Israelsen et al. | 382/253 |
| 5,812,788 A | 9/1998 | Agarwal | 395/200.77 |
| 5,831,678 A | 11/1998 | Proctor | 348/422 |
| 5,844,612 A | * 12/1998 | Israelsen | 375/240.14 |

OTHER PUBLICATIONS

Andrew S. Tanenbaum, "Computer Networks", 1981, Prentice–Hall, pp. 119–122.*

* cited by examiner

Primary Examiner—David D. Knepper
(74) Attorney, Agent, or Firm—William F. Bahret

(57) ABSTRACT

A technique to encode a group of vectors by quantizing the group with each of a number of different codes (44) and selecting the quantization results which are most favorable. This technique may include providing several vectors to an encoder (40) of a communication system (20) and quantizing each of the vectors with a number of different codebooks (44) to generate a corresponding number of codeword sets (44) with the encoder (40). The codeword sets are each representative of the vectors. Each of the codeword sets is evaluated by determining a corresponding distortion value. The codeword set with the lowest distortion is selected to encode the vectors based on this evaluation. The codebook (44) or sequence of codebooks (44) used to generate the selected codeword set may differ from one vector sample to the next to provide a sample adaptive coding scheme. Transmission of the encoded data to a decoder (50) of communication system (20) may also be performed where the original vectors are reconstructed.

32 Claims, 20 Drawing Sheets

| Lattice | Dimension | SACS | Side Information ($\eta$) |
|---|---|---|---|
| $A_2$ | 2 | $m$-SACS | 1 |
| $A_3$ | 3 | $m$-SACS | 1 |
| $A_3^\perp$ | 3 | 1-SACS | 1 |
| $D_m^\perp$ | $m$ | 1-SACS | $m-1$ |
| $D_m$ | $m$ | 1-SACS | 1 |
| $E_7$ | 7 | 1-SACS | 3 |
| $E_8$ | 8 | 1-SACS | 4 |

TABLE I

*Fig. 12*

| Codeword | Lloyd-Max bit rate=3 | $\beta$=1, bit rate = 3.125 | | $\beta$=1, bit rate = 3.016 | |
|---|---|---|---|---|---|
| | | Code 1 | Code 2 | Code 1 | Code 2 |
| 1 | -2.152 | -2.46 | -1.82 | -2.40 | -1.92 |
| 2 | -1.344 | -1.44 | -1.12 | -1.49 | -1.18 |
| 3 | -0.7560 | -0.848 | -0.590 | -0.879 | -0.626 |
| 4 | -0.2451 | -0.347 | -0.115 | -0.359 | -0.131 |
| 5 | 0.2451 | 0.120 | 0.355 | 0.122 | 0.358 |
| 6 | 0.7560 | 0.600 | 0.855 | 0.618 | 0.875 |
| 7 | 1.344 | 1.14 | 1.45 | 1.17 | 1.50 |
| 8 | 2.152 | 1.85 | 2.51 | 1.91 | 2.44 |
| Distortion | 0.03454 | 0.0245 | | 0.0313 | |
| Iterations | | 27 | | | |

TABLE II

*Fig. 24*

| Codeword | Lloyd-Max bit rate=3 | Variation 1 | | | | Variation 2 | | | |
|---|---|---|---|---|---|---|---|---|---|
| | | Code 1 | | Code 2 | | Code 1 | | Code 2 | |
| 1 | -2.152 | $+\epsilon'$ | -1.79 | $-\epsilon'$ | -2.48 | $+\epsilon'$ | -1.78 | $-\epsilon'$ | -2.48 |
| 2 | -1.344 | $+\epsilon'$ | -1.12 | $-\epsilon'$ | -1.42 | $-\epsilon'$ | -1.11 | $+\epsilon'$ | -1.42 |
| 3 | -0.7560 | $+\epsilon'$ | -0.615 | $-\epsilon'$ | -0.804 | $+\epsilon'$ | -0.601 | $-\epsilon'$ | -0.814 |
| 4 | -0.2451 | $+\epsilon'$ | -0.200 | $-\epsilon'$ | -0.250 | $-\epsilon'$ | -0.170 | $+\epsilon'$ | -0.278 |
| 5 | 0.2451 | $-\epsilon'$ | 0.182 | $+\epsilon'$ | 0.291 | $+\epsilon'$ | 0.214 | $-\epsilon'$ | 0.256 |
| 6 | 0.7560 | $-\epsilon'$ | 0.618 | $+\epsilon'$ | 0.830 | $-\epsilon'$ | 0.628 | $+\epsilon'$ | 0.807 |
| 7 | 1.344 | $-\epsilon'$ | 1.13 | $+\epsilon'$ | 1.45 | $+\epsilon'$ | 1.13 | $-\epsilon'$ | 1.44 |
| 8 | 2.152 | $-\epsilon'$ | 1.82 | $+\epsilon'$ | 2.52 | $-\epsilon'$ | 1.80 | $+\epsilon'$ | 2.50 |
| Distortion | 0.03454 | 0.0247 | | | | 0.0247 | | | |
| Iterations | | 35 | | | | 135 | | | |

TABLE III

*Fig. 25*

SAMPLE-ADAPTIVE PRODUCT QUANTIZATION

CROSS REFERENCE TO RELATED APPLICATIONS

This application is a con of PCT/US99/00436 Jan. 8, 1999 which claims the benefit of Provisional Application Ser. No. 60/070,730, filed 8 Jan. 1998.

BACKGROUND

The present invention relates to a method and system of coding information, and more particularly, but not exclusively, relates to a coding technique which is based on the quantization of a sample of vectors a number of times with different codes or codebook arrangements.

A variety of coding schemes have been proposed to improve data transmission and storage for signal processing systems. These systems have a broad range of applications including telecommunications, digital imaging and audio recording devices, digital television, and multimedia computing to name a few. Generally, there is a trade-off between the degree of distortion associated with a particular coding scheme and the degree of complexity of the scheme. Thus, there is an ongoing need for coding techniques that minimize both distortion and complexity.

The present invention satisfies this need and provides other significant benefits and advantages.

SUMMARY OF THE INVENTION

The present invention relates to a system and method of coding information. Various aspects of the invention are novel, nonobvious, and provide various advantages. The following summarizes various aspects of the invention, but the full scope and nature of the invention can only be determined from the claims appended hereto.

One form of the present invention is a technique to encode a group of vectors by quantizing the group with each of a number of different codes or codebooks and selecting the quantization results which are most favorable. Data may be transmitted corresponding to the most favorable results to represent the vectors.

In another form, a method includes providing several vectors for encoding. Each of the vectors is quantized with a number of different codebooks to generate a corresponding number of codeword sets with the encoder. The codeword sets are each representative of the vectors. Each of the codeword sets is evaluated by determining a corresponding performance characteristic. One of the codeword sets is selected to encode the vectors based on this evaluation. The performance characteristic may be determined as a function of a number of codewords in the corresponding one of the codeword sets and may correspond to a measure of distortion.

Still another form includes providing an encoder with a number of different codebooks and establishing a group of a number of vectors. This form includes quantizing each of the vectors of the group with each of the codebooks to provide a corresponding number of different codeword sets each representative of the group. Distortion of each of the codeword sets is evaluated. The codeword set that has less distortion than any other of the codeword sets is selected to encode the group.

In a further alternative form, a number of vectors are provided to an encoder for processing as a group with an established order. A number of codeword sets are generated that are each representative of the group. The sets each correspond to quantization of the vectors by a different sequential arrangement of codebooks relative to the established order of the group. The codeword sets are each evaluated by determining a corresponding performance characteristic. One of the codeword sets is selected to encode the group based on this evaluation. The performance characteristic may be determined as a function of the codewords in one or more of the sets and may correspond to a measure of distortion.

These and other forms of the present invention may also include transmitting data corresponding to one of the codeword sets with the encoder over a channel to a decoder and decoding the data to provide at least one signal representative of the vectors. This transmitted data may include a value representing one of the codebooks used to generate the one of the codeword sets corresponding to the transmitted data. The present invention may also include empirically determining a property corresponding to a distribution function of the vectors or quantizing each of the codeword sets with a different sequence of codes or codebooks relative to an established order of the vectors. Also, the codebooks may number at least as many as the number of vectors. Preferably, the different codebooks number at least two. More preferably, the different codebooks number at least four.

In an additional form, the present invention includes the combination of an encoder coupled to a decoder by a communication channel. The encoder includes a number of different codebooks, a number of quantizers, a comparator, and a multiplexor. The quantizers each receive a common set of vectors for quantization with a different one of the codebooks to provide a corresponding codeword set representative of the set of vectors. The quantizers each provide one of a number of performance signals characterizing distortion of the corresponding codeword set. The comparator responds to the performance signals to generate a selection signal corresponding to the quantizer providing the codeword set with the lowest distortion relative to the other codeword sets. The multiplexor responds to the selection signal to transmit data to the decoder along the communication channel which is representative of the corresponding codeword set with the lowest distortion. The performance signals may correspond to a level of distortion of the corresponding codeword set. The encoder may empirically determine a property of the set of vectors corresponding to a distribution function. Furthermore, each quantizer may apply one of a number of different sequential arrangements of the codebooks to the set of vectors relative to a predetermined order of the vectors to provide the corresponding codeword set.

Still another form of the present invention includes an encoder with a number of different codebooks for encoding a sample of several vectors. The encoder includes a first means for quantizing each of the vectors with each of the codebooks to generate a corresponding number of codeword sets each representative of the vectors and a second means for providing an evaluation of each of the codewords sets by determining a corresponding performance characteristic for each of the codeword sets. Also included is a third means for selecting one of the codewords sets for transmission by the encoder based on the evaluation.

Yet another form of the present invention is an encoder having an input configured to receive vector data and an output for transmitting encoded data representative of the vector data. The encoder includes codebook data corresponding to a number of different codebooks and is responsive to the vector data to define a group of vectors from the vector data and quantize the group with each of the different codebooks to provide a number of codeword sets each representative of the group. The encoder calculates distortion of each of the codeword sets and provides the encoded data to the output corresponding to a member of the codeword sets having less distortion than any other member of the codeword sets. This combination may further include a communication channel coupled to the output of the encoder to receive the encoded data and a decoder coupled to the communication channel responsive to the encoded data to decode the encoded data and output at least one signal representative of the vectors. The decoder may include the codebook data. The encoder may be configured to empirically determine a property of the vectors of the group corresponding to a distribution function and the codeword sets may correspond to a different sequential arrangement of the codebooks relative to a predetermined order of the vectors of the group.

In further forms of the present invention, any of the above-indicated forms may be arranged to encode one or more samples comprised of a number of scalar values either in addition to or in lieu of vectors. Also, further forms may include a technique to determine a code class for use in various coding schemes. This technique may include a process to determine a code class based on a number of training samples and/or an initial code class determination process based on application of a split constant method. An improved method of generating a lattice-based quantizer or quantization process is provided in yet another form of the present invention.

Accordingly, one object of the present invention is to provide an improved coding system.

Another object of the present invention is to provide an improved coding method.

Further objects, features, forms, advantages, benefits, and aspects of the present invention shall become apparent from the drawings and description provided herein.

BRIEF DESCRIPTION OF THE DRAWINGS

FIG. 12 depicts table I presenting data concerning various root lattices and SACS.

FIGS. 24 and 25 depict Tables II and III, that respectively tabulate data regarding code design in accordance with the present invention. Table II presents Lloyd-Max and code classes for η=1, Gaussian distribution (0,1), and n=8. Table III presents the code classes and initial code classes for η=1, Gaussian distribution (0,1), n=8, $\in'$=0.001, β=1, and bit rate=3.125.

DESCRIPTION OF THE PREFERRED EMBODIMENTS

Figure 1:
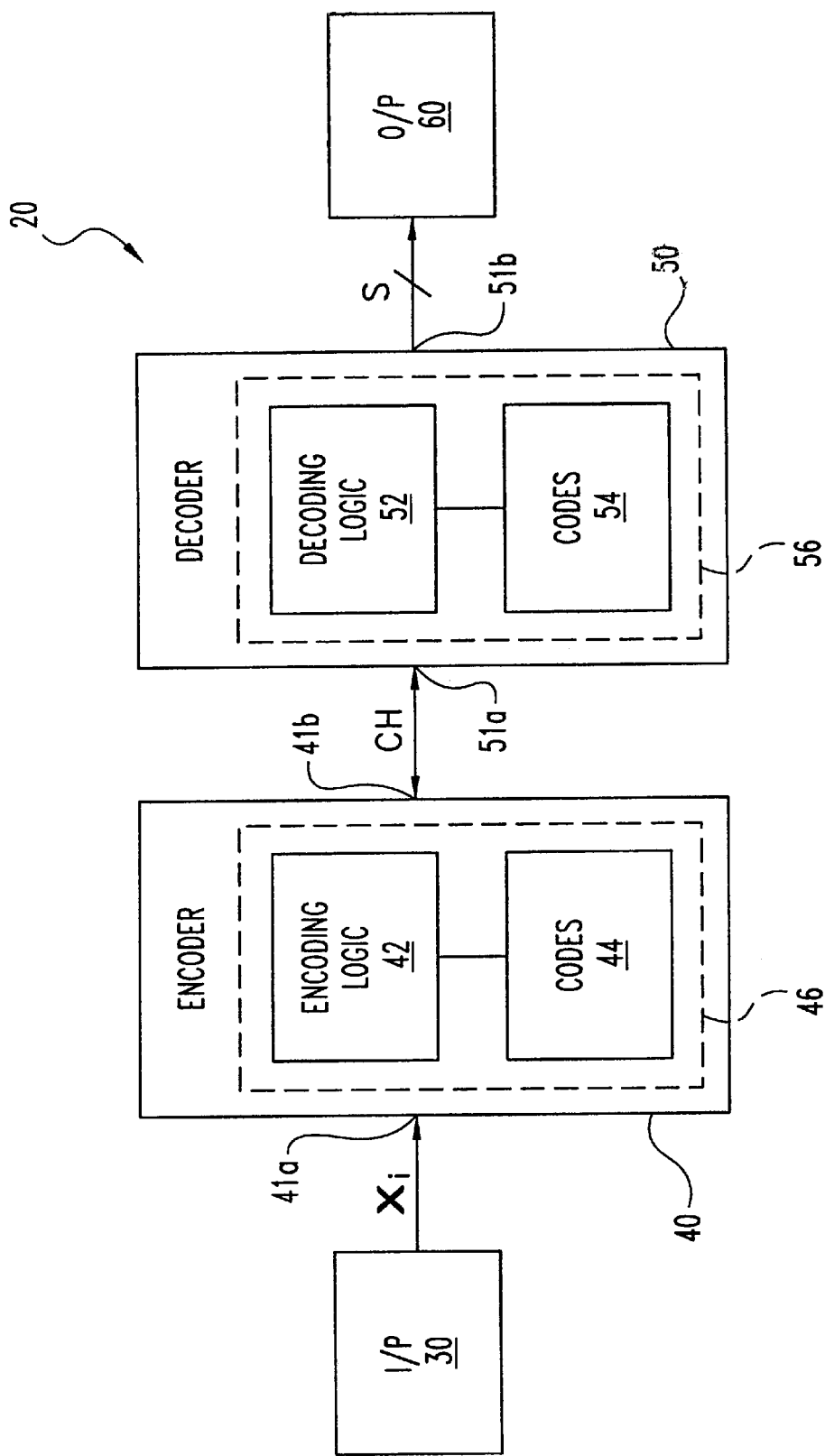
FIG. 1 is a schematic view of a communication system.

For the purposes of promoting an understanding of the principles of the invention, reference will now be made to various embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One preferred embodiment of the present invention concerns block source coding techniques. Block source coding is a mapping from vector space $\mathbb{R}^k$ into a finite subset that is called a code or a codebook. Generally, the average distortion of block source coding on a random vector in space $\mathbb{R}^k$ may be decreased as the block (vector) size k gets larger. Moreover, the average distortion typically converges to the distortion given by the corresponding rate distortion function. One type of block source coder is based on a discrete-time memoryless stationary vector source modeled as an independently and identically distributed (i.i.d.) sequence of random vectors $(\mathbf{X}_i)$ for i=1 to m, where $\mathbf{X}_i = (\mathbf{X}_{1i}, \ldots, \mathbf{X}_{ki})^T$ is a random vector in $\mathbb{R}^k$ and m is the sample size or the sequence size. For this model, let F be defined as the distribution function (d.f.) of $\mathbb{R}_i$. F is continuous and the expectation relationship $E\|\mathbb{R}_i\|^r < \infty$; where $\|\cdot\|^r$ denotes the rth power $\mathscr{L}^2$ norm to be used for a distortion measure. Also, let $C_n := \{y_1, \ldots, y_n\}$ denote an n-level code which has n codewords, and let $\mathbf{C}_n$ denote the class of all n-level codes that have real values in $\mathbb{R}^k$. The block source coder is then described by a function $Q_{C_n}(x)$ called vector quantization (VQ). This function is defined in equation (1) as follows:

$$Q_{C_n}(x) := \arg\min_{y \in C_n} \|x - y\|^r, \qquad (1)$$

where $x \in R^k$ and $C_n \in \mathbf{C}_n$. Further, $D_r(C_n, F)$, the average distortion achieved when a random vector is quantized using code $C_n$, is given by equation (2) as follows:

$$D_r(C_n, F) := \int \|x - Qc_n(x)\|^r dF(x). \qquad (2)$$

In equation (2), the bit rate (defined as bits per source symbol) is $(\log_2 n)/k$. Focusing on a fixed length coding approach, the quantity $\inf_{C_n \in \mathbf{C}n} D_r(C_n, F)$ is called (n-level) F-optimal distortion, and a code $C^*_n$ that yields the F-optimal distortion is called an (n-level) F-optimal code, i.e., $D_r(C^*_n, F) = \inf_{C_n \in \mathbf{C}n} D_r(C_n, F)$ if $C^*_n$ exists. The corresponding quantizer, when k=1, is called the Lloyd-Max quantizer. The articles: J. Max, "Quantizing for minimum distortion," *IRE Trans. Inform. Theory*, vol. IT-6, pp. 7–12, March 1960; and S. P. Lloyd, "Least squares quantization in PCM," *IEEE Trans. Inform. Theory*, vol. IT-28, no. 2, pp. 128–137, March 1982 are cited as additional sources of information regarding the Lloyd-Max quantizer.

For this arrangement, let a sample be denoted by $(\mathbf{X}^\omega_i)$ for i=1 to m, where $\omega$ is a sample point of the underlying sample space $\Omega$ corresponding to $\mathbf{X}_i$. Typically, since the source $(\mathbf{X}_i)^m_{i=1}$ is a discrete-time memoryless stationary source, typical coding schemes quantize each sample $(\mathbf{X}^\omega_i)$ for i=1 to m by applying the same quantizer using an F-optimal code to each $\mathbf{X}_i$ independently. The rationale for quantizing each random vector independently and identically is generally motivated by the i.i.d. quality of the random vectors $\mathbf{X}_i$. For such a scheme, the overall distortion is given by equation (3) as follows:

$$E\left[\frac{1}{m}\sum_{i=1}^{m} \|X_i - Q_{C_n^*}(X_i)\|^r\right] = D_r(C_n^*, F), \qquad (3)$$

which is the same as the F-optimal distortion of quantizing a single random vector $X_i$ and is designated herein as the independent and identical coding scheme (IICS). A specific example of IICS for k=1 (scalar quantization) is the Pulse Code Modulation (PCM) scheme, where an F-optimal code is applied independently and identically to each random variable. The Differential PCM (DPCM) scheme, which is sometimes used in speech coding, also quantizes each difference sample based on IICS.

However, even if the source is i.i.d., independently and identically quantizing each random vector of $(\mathbf{X}_i)^m_{i=1}$ is just one of the many possible coding schemes. For example, one approach that generally out-performs IICS includes representing the source $(\mathbf{X}_i)_i$ by a single index taking $n^m$ values (in other words, the km-dimensional VQ is used). For the km-dimensional VQ, a lower distortion may typically be achieved for the same bit rate as compared to IICS. The encoding complexity of the km-dimensional VQ is however extremely high, especially at high bit rates. In order to circumvent the encoding complexity of this VQ, various modifications may be utilized. For example, a tree-structured VQ (based on a tree search of the codewords), the classified VQ, the product VQ (where a large vector is partitioned into subvectors), the multistage VQ, and/or lattice VQ techniques may be adopted for reducing the encoding complexity of the km-dimensional VQ structure. However, regardless of the techniques employed, since the quantization still has the km-dimensional VQ structure, the encoding complexity is high (on the order of km-dimensional VQ) and performance of such modifications still generally fall between the performance of the k-dimensional VQ and the performance of the km-dimensional VQ.

In contrast to these techniques, sample-adaptive coding schemes (generally abbreviated SACS) according to the present invention provide better performance than IICS, with a complexity comparable to standard k-dimensional VQ techniques. SACS is based on adaptation to each sample $(\mathbf{X}^\omega_i)^m_{i=1}$. Referring to FIG. 1, communication system 20 of one embodiment of the present invention is illustrated. System 20 utilizes SACS to encode data provided to encoder 40 by at least one input device (I/P) 30. Encoder 40 is coupled to decoder 50 by communication channel CH. Decoder 50 is coupled to at least one output device (O/P) 60. Input device 30 may be any of a number of input devices capable of providing a number of data values, such as vectors $\mathbf{X}_i$; where $\mathbf{X}_i$ represents a random vector of dimension k as previously discussed. Input device 30 sequentially provides a number of vectors $\mathbf{X}^\omega_i$ to input 41a of encoder 40. Encoder 40 includes encoding logic 42 operatively coupled to corresponding codes 44. Encoder 40 includes output 41b to provide for transmission of encoded data representative of vectors $\mathbf{X}_i$ on channel CH.

The encoded data transmitted on channel CH is provided to input 51a of decoder 50. Decoder 50 includes decoding logic 52 operatively coupled to codes 54 to decode the encoded data provided from encoder 40 via channel CH. Preferably, codes 54 are the same as codes 44. Decoder 50 transmits one or more signals S from output 51b representative of the decoded data to output device 60. Output device 60 may be any type of device responsive to the decoded data. Input device 30 and output device 60 may include any signal format converters (such as analog-to-digital or digital-to-analog converters), filters, buffers, modulators, or other signal conditioning or processing devices as would occur to those skilled in the art to provide suitable communications with encoder 40 and decoder 50, respectively. Likewise, encoder 40 and/or decoder 50 include any signal format converters, modulators, buffers, filters or other signal conditioning or signal processing devices as would occur to those skilled in the art to provide for suitable communication via channel CH.

In one embodiment of system 20, input device 30 may be configured to receive an audio signal and convert this signal into a series of data vectors $\mathbf{X}^\omega_i$ which are subsequently provided to encoder 40 via input 41a. Encoder 40 encodes the audio information and transmits data corresponding to the encoded vectors $\mathbf{X}^\omega_i$ over channel CH. For this embodiment, input device 30 and encoder 40 may be part of a hand-held wireless telephone receiver and channel CH may be satellite-linked wireless communication channel. Correspondingly, for this embodiment, decoder 50 receives the encoded audio information via channel CH and reconstructs one or more audio signals S for output by an audio speaker included as part of output device 60.

In yet another embodiment, input device 30 and encoder 40 are provided as part of a digital imaging device which detects an image and generates a series of vectors $\mathbf{X}^\omega{}_i$ representative of pixels of the image. These pixels are then encoded by encoder 40 and provided to decoder 50 via channel CH. For this embodiment, channel CH may be, for example, a computer network pathway or a dedicated pathway within a computer workstation. Decoder 50 and output device 60 may be remotely located relative to input device 30 and encoder 40 to reconstruct the digital image provided via the encoded data on channel CH. Output device 60 may include a display device, such as a Liquid Crystal Display (LCD) or Cathode Ray Tube (CRT), to output a reconstructed image after decoding with decoder 50. In still other embodiments, further arrangements and applications of system 20 are envisioned as would occur to one skilled in the art.

Figure 2:
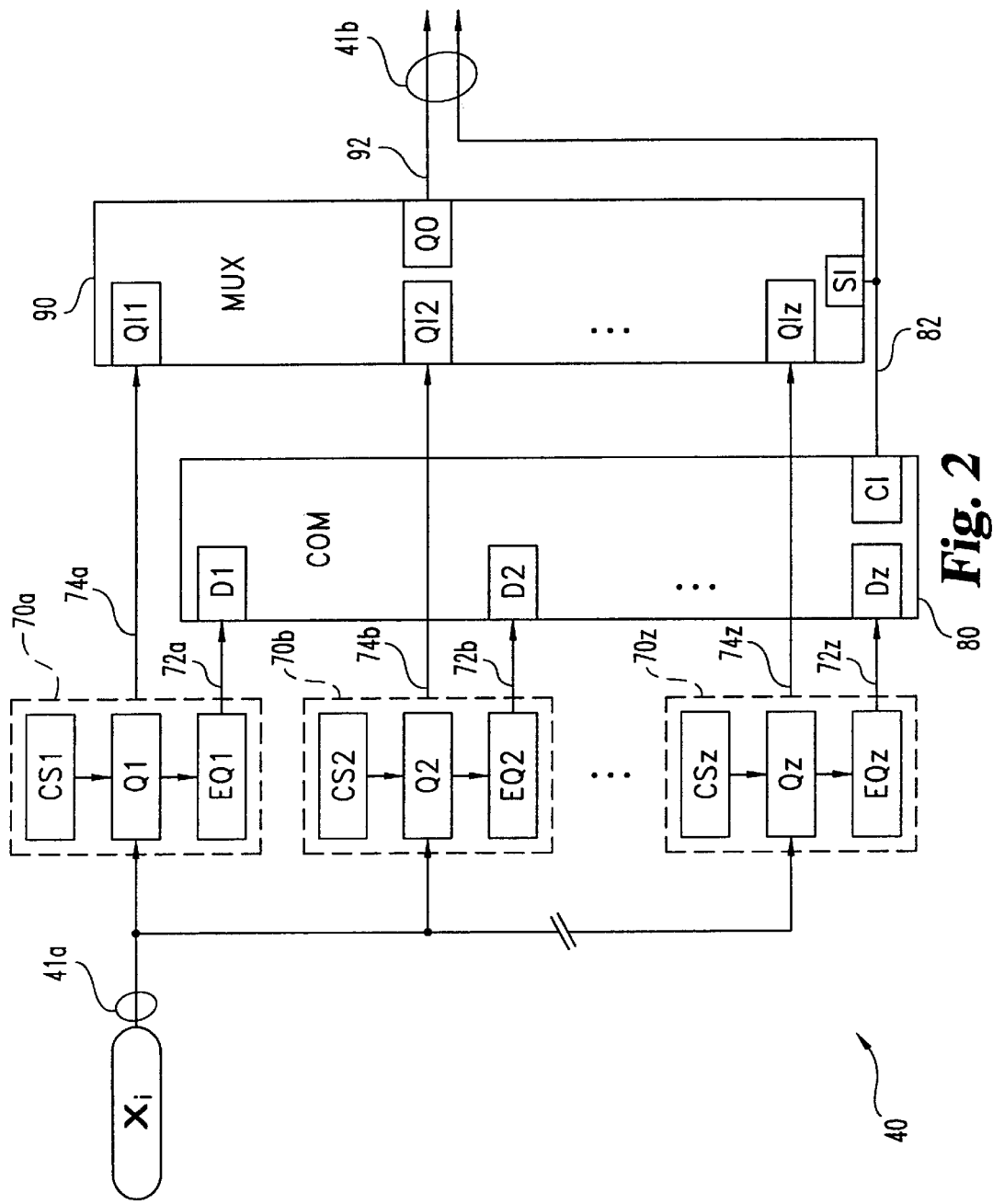
FIG. 2 is a schematic view showing selected details of an encoder of the system depicted in FIG. 1.

In the system 20 embodiment of SACS, a predetermined set of $2^\eta$ code sequences are available at both encoder 40 and the decoder 50. For each sample of m vectors provided to encoder 40 by input device 30, encoding logic 42 selects one of these $2^\eta$ code sequences from codes 44 to encode the multivector sample. Referring additionally to the schematic view of FIG. 2, selected details of system 20 are further illustrated. In FIG. 2, encoding logic 42 and codes 44 of encoder 40 are arranged as processing units 70a, 70b, and 70z (collectively designated units 70 or units 70a–70z). A vertical ellipse is shown between processing units 70b and 70z to represent the inclusion of additional like processing units which are not shown to preserve clarity. It is preferred that the number of these units equal the number of code sequences, $2^\eta$. The number of $2^\eta$ is alternatively represented by the suffix "z" in connection with selected feature designators used to described the present invention. Throughout this description and the figures, ellipses are used between elements or designators to represent an optional number of like, interposed units. However, it should be likewise understood that in alternative embodiments, fewer than the three processing units 70, may be utilized corresponding to $\eta<2$ (not shown).

Each processing unit 70 is configured to receive a common set or group of m number of vectors $X^\omega{}_i$ for i=1 to m, in the same sequence which may alternatively be designated a "sample" of m vectors. Processing units 70a–70z correspondingly include code sequences CS1, CS2, ..., CSz (alternatively designated CS1–CSz) each operatively coupled to corresponding one of quantizers Q1, Q2, ..., Qz to provide codebook sequence information thereto. Quantizers Q1, Q2, ..., Qz (alternatively designated Q1–Qz) each receive the sample of m vectors and are each coupled to a different one of the code sequences CS1–CSz; where sequences CS1–CSz are preferably each different. The quantized output of each quantizer Q1–Qz is provided to a corresponding evaluation unit EQ1, EQ2, ..., EQz (alternatively designated EQ1–EQz). Because the suffix "z" represents the number $2^\eta$, code sequence CSz, quantizer Qz, and evaluation unit EQz of processing unit 70z are the $2^\eta$th code sequence, $2^\eta$th quantizer, and $2^\eta$th evaluation unit, respectively. Correspondingly, processing unit 70z may alternatively be considered the $2^\eta$th processing unit.

Each evaluation unit EQ1–EQz provides an input along a corresponding one of signal paths 72a, 72b, ..., 72z (alternatively designated 72a–72z) to comparator 80. The comparator 80 inputs for paths 72a–72z are respectively designated distortion measure inputs D1, D2, ..., Dz (alternatively designated D1–Dz). Comparator output CI corresponds to the lowest distortion measure input D1–Dz. Each quantizer Q1–Qz provides an input along a corresponding one of signal paths 74a, 74b, ..., 74z (alternatively designated 74a–74z) to multiplexor 90. These multiplexor 80 inputs are respectively designated quantizer index inputs QI1, QI2, ..., QIz (collectively designated QI1–QIz). Output CI of comparator is operatively coupled to selection input SI of multiplexor 90 by signal path 82 to determine which multiplexor input QI1–QIz will be routed to multiplexor output QO along signal path 92. Collectively signal paths 82, 92 provide output 41b of encoder 40.

Figure 3:
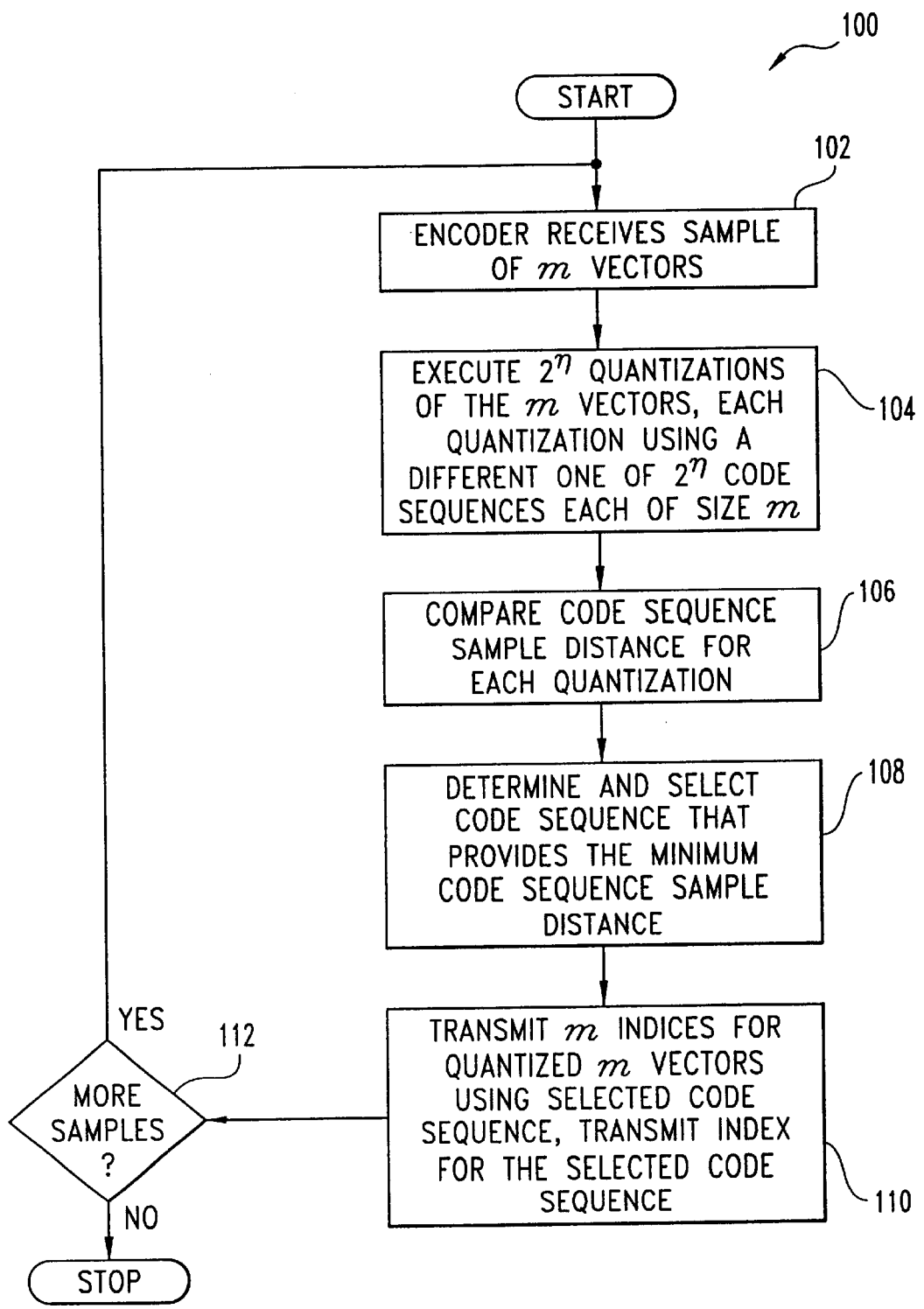
FIG. 3 is a flow chart illustrating an encoding process executed by the system of FIG. 1.
Figure 4:
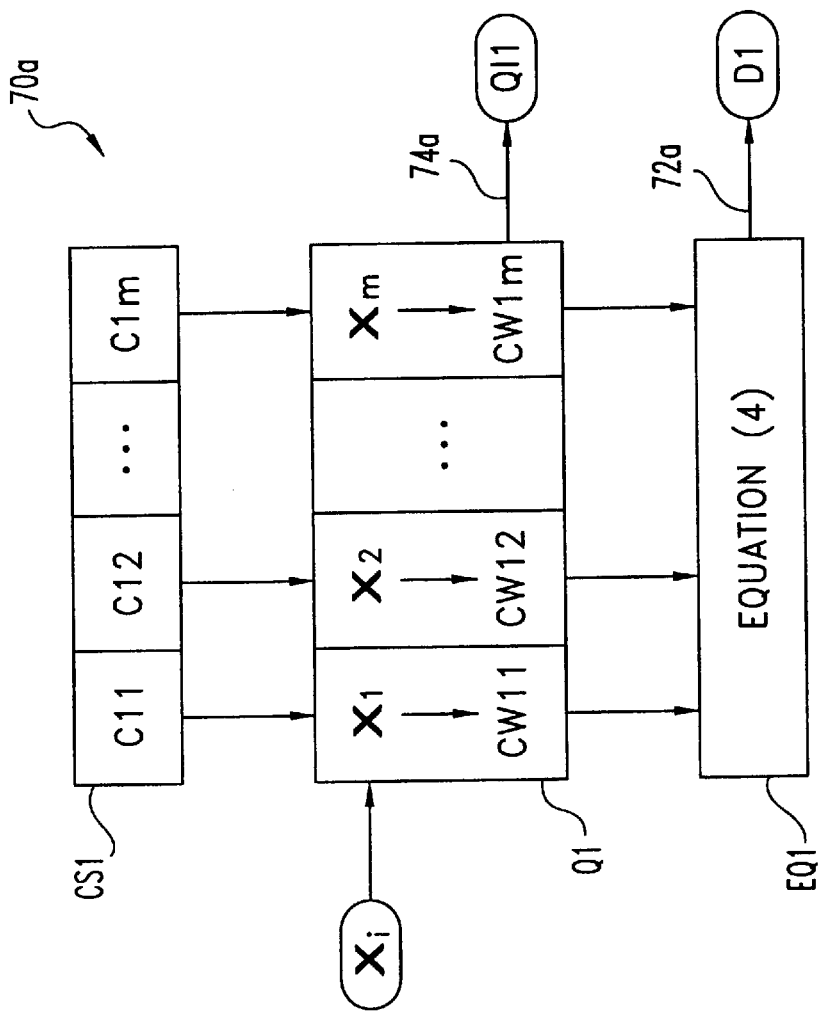
FIG. 4 is a schematic view showing selected details of a processing unit of the encoder depicted in FIG. 2.

In FIG. 3, one embodiment of a SACS-based encoding process 100 for system 20 is shown. Process 100 begins with the sequential entry of the vector sample $\mathbf{X}^\omega{}_i$ for i=1 to m into encoder 40 via input 41a in operation 102. Each of quantizers Q1–Qz receives the m vectors of the sample during operation 102. Referring also to FIG. 4, selected details of a representative unit 70, specifically unit 70a, are depicted. Code sequence CS1 of unit 70a is diagrammatically shown with a number of codebooks C11, C12, ..., C1m (alternatively designated C11–C1m). Each codebook C11–C1m corresponds to a different one of the m vectors X1, X2, ..., Xm (alternatively designated X1–Xm) received by quantizer VQ1; where vectors X1–Xm are equivalent to the term $\mathbf{X}^\omega{}_i$ for i=1 to m. In operation 104, encoder 40 quantizes $\mathbf{X}^\omega{}_i$ for i=1 to m (vector sample X1–Xm) using a different one of codebooks C11–C1m for each of the m vectors of the sample in accordance with equation (1), where C11–C1m correspond to $C^i_n$ of equation (1) ($C^i_n \in \mathbf{C}_n$=class of all n-level codes) for i=1 to m. As a result of this quantization, quantizer Q1 provides a corresponding set of selected codewords CW1, CW2, ..., CWm (alternatively designated CW1–CWm) representative of the sample of m vectors. Each member of the set of m codewords CW1–CWm is represented by an index to the corresponding codebook C11–C1m. These m codebook indices are output by quantizer Q1 along signal pathway 74a as quantizer index input QI1 to multiplexor 90. Codewords CW11–CW1m are also provided to evaluation unit EQ1.

During operation 104, each of the remaining quantizers Q2–Qz also quantize vectors X1–Xm in accordance with equation (1) using a corresponding one of code sequences CS2–CSz in place of code sequence CS1. Code sequences CS2–CSz each preferably include m number of different codes or codebooks. For code sequence CS2, these codebooks may be designated C21, C22, ..., C2m (C21–C2m) and for sequence CSz these codebooks may be designated Cz1, Cz2, ..., Czm to provide a few examples. Correspondingly, quantizers Q2–Qz each provide a set of codewords representative of the m vectors X1–Xm to a respective evaluation unit EQ2–EQz and provide a corresponding m number of codebook indices on each corresponding signal path 74b–74z to respective quantizer index inputs QI2–QIz of multiplexor 90. For quantizer Q2, the output codewords may be represented as CW21, CW22, ..., CW2m; and for quantizer Qz, the output codewords may be represented as CWz1, CWz2, ..., CWzm, to provide a few examples.

Operation 104 provides for $z=2^\eta$ quantizations with indices to the resulting codewords being output by quantizers Q1–Qz on signal paths 74a–74z to inputs QI1–QIz of multiplexor 90. Also, each evaluation unit EQ1–EQz receives a set of m codewords from the corresponding quantizer Q1–Qz. In operation 106, evaluation units EQ1–EQz each compute a code sequence sample distance for the codeword set it receives from the respective quantizer Q1–Qz (alternatively designated an m-code sample distance) in accordance with equation (4) as follows:

$$\frac{1}{m}\sum_{i=1}^{m} \left\| X_i^\omega - Q_{C_n^i}(X_i^\omega) \right\|^r. \tag{4}$$

As used in equation (1), the term $C^i_n$, for i=1 to m, is the code sequence CS1–CSz corresponding to the given evaluation unit EQ1–EQz, and the terms $Qc^i_n(\mathbf{X}^\omega_i)$ for i=1 to m are the codeword set received from the respective quantizer. The distance provided by equation (4) is indicative of a distortion level for quantization with the corresponding code sequence CS1–CSz. A sample adaptive coding scheme (SACS) based on the m-code sample distance is designated an m-SACS. The distance of equation (4) is a random variable defined on the underlying sample space if $\mathbf{X}^w_1, \ldots, \mathbf{X}^w_m$ is replaced with the random vector $\mathbf{X}_1, \ldots, \mathbf{X}_m$. Note that quantization of these m random vectors employs a sequence of m codes as shown in the m-code sample distance. Also, even if the random vectors are i.i.d., the m codes in a code sequence may have different code sizes.

The m-code sample distance of each evaluation unit EQ1–EQz is provided along corresponding signal paths 72a–72z as a respective distortion input D1–Dz to comparator 80. In operation 108, comparator 80 determines which distortion measure D1, D2, . . . , or Dz is lowest and provides an index for the quantizer providing the codeword set with the lowest distortion as code index output CI. Code index output CI indicates which of the finite codebook sequences CS1–CSz provides the lowest distortion for the quantized sample of m vectors. Code index output CI is provided along signal path 82 to selection input SI of multiplexor 90. Also, multiplexor 90 has quantizer index inputs QI1–QIz that each receive the codeword indices from a different one of quantizers Q1–Qz. In response to receiving output CI at selection input SI, multiplexor 90 selects one of quantizer index inputs QI1–QIz to route to output QO. The selected quantizer index input QI1–QIz correspondingly provides to output QO the codeword indices from the unit 70 that has the lowest distortion input D1–Dz to comparator 80.

In operation 110, the output of multiplexor 90 along signal path 92 and the output of comparator 80 along signal path 82 collectively provide the encoded data for transmission through output 41b of encoder 40 to channel CH. Preferably, data received and transmitted by encoder 40 is in a binary format with logic 42 being of a digital variety. Correspondingly, codes 44 are preferably utilized in a binary format and stored in a digital memory associated with encoder 40. For these preferences, it should be appreciated that code index output CI may be represented on signal path 82 by $\eta$ bits. For the sample of m vectors processed by encoder 40, the signal routed along pathway 92 includes an index to the appropriate codeword for each of the m vectors represented. Taking n as the integer bit length of each codeword, each codeword index routed through multiplexor 90 in correspondence with the minimum distortion code sequence may be represented by $\log_2(n)$ bits. Thus, the output of multiplexor 90 for the m group of vectors $X_i$ may be represented by $m(\log_2(n))$ bits.

At conditional 112 of encoding process 100, it is determined whether there are additional vector samples to encode. If there is an additional sample, then control flows back to operation 102 to receive the next sample for processing in accordance with the series of operations 104, 106, 108, 110. If there are no more samples to encode, process 100 terminates. Alternatively, process 100 may include entry into an idle loop until another sample requiring encoding is detected or operation of system 20 is terminated.

Figure 9:
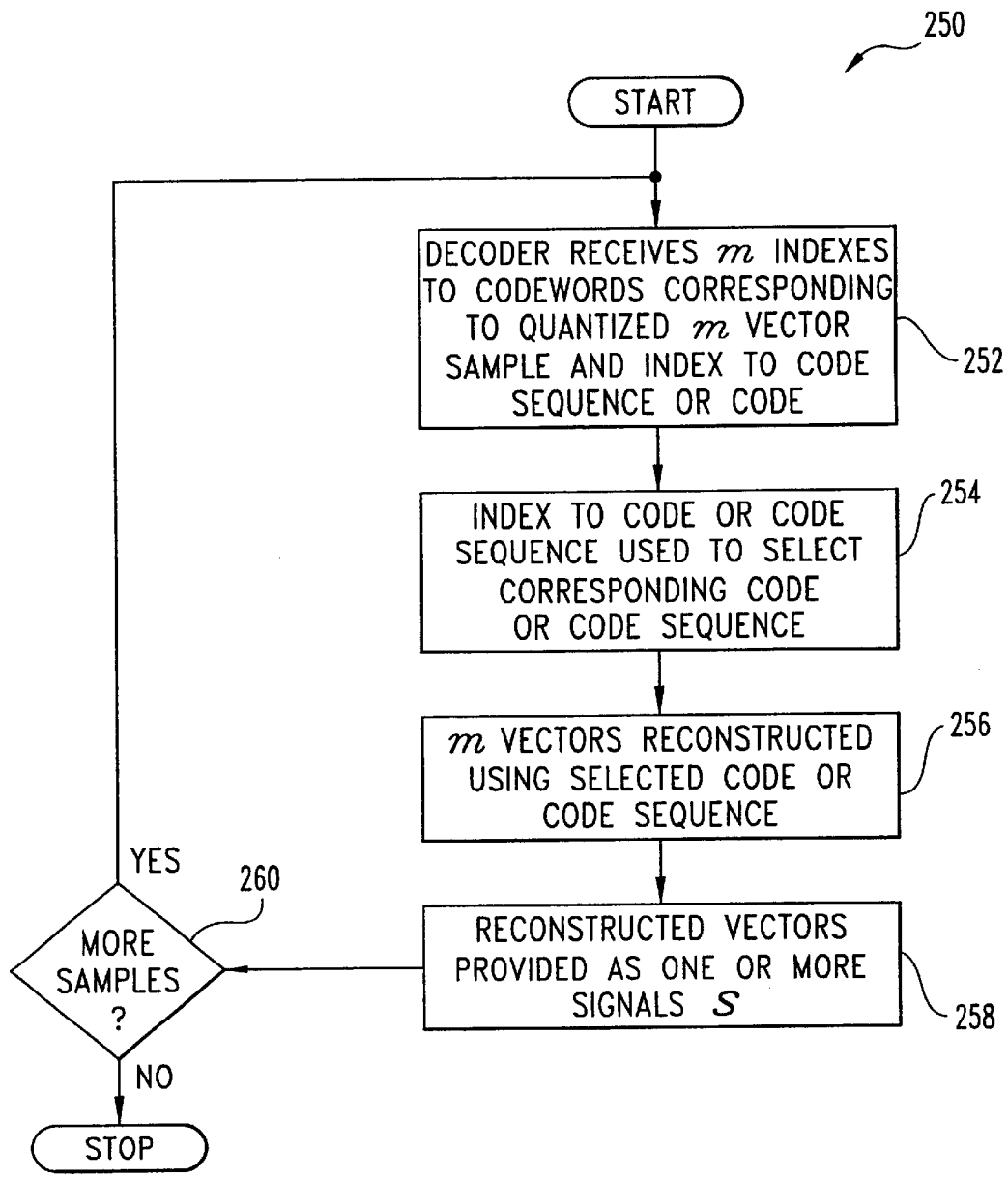
FIG. 9 is a flow chart illustrating a decoding process for the systems of FIGS. 1 and 5.

Referring back to FIG. 1, decoder 50 receives encoded data from channel CH via input 51a. Decoder 50 includes logic 52 and codes 54 to reconstruct vectors representative of the sample encoded by encoder 40. Further details concerning one preferred embodiment of this decoding process 250 are described in connection with FIG. 9 and accompanying text.

For each sample $(\mathbf{X}^\omega_i)$ for i=1 to m, encoder 40 finds a code sequence, from a finite class of code sequences CS1–CSz, that yields the minimum distance given by equation (4). Let $(C^{i,j}_n)^m_{i=1}$ denote the jth code sequence of a given class of code sequences and assume that the class has $2^\eta$ code sequences, where $\eta$ is a positive integer. The resultant distortion given by taking expectations in equation (4) is provided by equation (5) as follows:

$$E\frac{1}{m}\min_j \sum_{i=1}^{m} \left\| X_i - Q_{C_n^{i,j}}(X_i) \right\|^r = \frac{1}{m}\int \min_j \sum_{i=1}^{m} \left\| x_i - Q_{C_n^{i,j}}(x_i) \right\|^r dF^m, \tag{5}$$

where $j \in \{1, 2, \ldots, 2^\eta\}$, $dF^m$ denotes $dF(x_1) \ldots dF(x_m)$, and $\int$ denotes a km-fold integral. The expected distortion given in equation (5) is designated the sample-adaptive distortion.

The m codeword indices and the code index may collectively constitute the encoded data provided by encoder 40 for a given sample. For each sample, encoder 40 preferably transmits the indices in a feed-forward adaptive scheme with the indices being in a binary form. This approach facilitates utilizing different code sequences for each sample of $(\mathbf{X}_i)$ for i=1 to m. In other words, the encoder quantizes m elements of a sample $\mathbf{X}^\omega_i$ for i=1 to m, using a code sequence of size m from $2^\eta$ code sequences and replaces the code sequence for each sample. Therefore the total bit rate is given by equation (6) as follows:

$$\frac{m \log_2 n + \eta}{km} = \frac{\log_2 n}{k} + \frac{\eta}{km}, \tag{6}$$

where $\eta$ corresponds to the additional information required to indicate which code sequence is employed. For system 20, it should be appreciated that the code sequence may be changed adaptively for each sample that contains m vectors. Even for a memoryless source, the empirical distribution function that is constructed using $X^\omega_i$ may be substantially different from F, especially for small values of m. For m-SACS embodiments of the present invention, such as system 20, it is preferred that $\eta$ be selected to be at least 1 and more preferably be at least 2.

Figure 5:
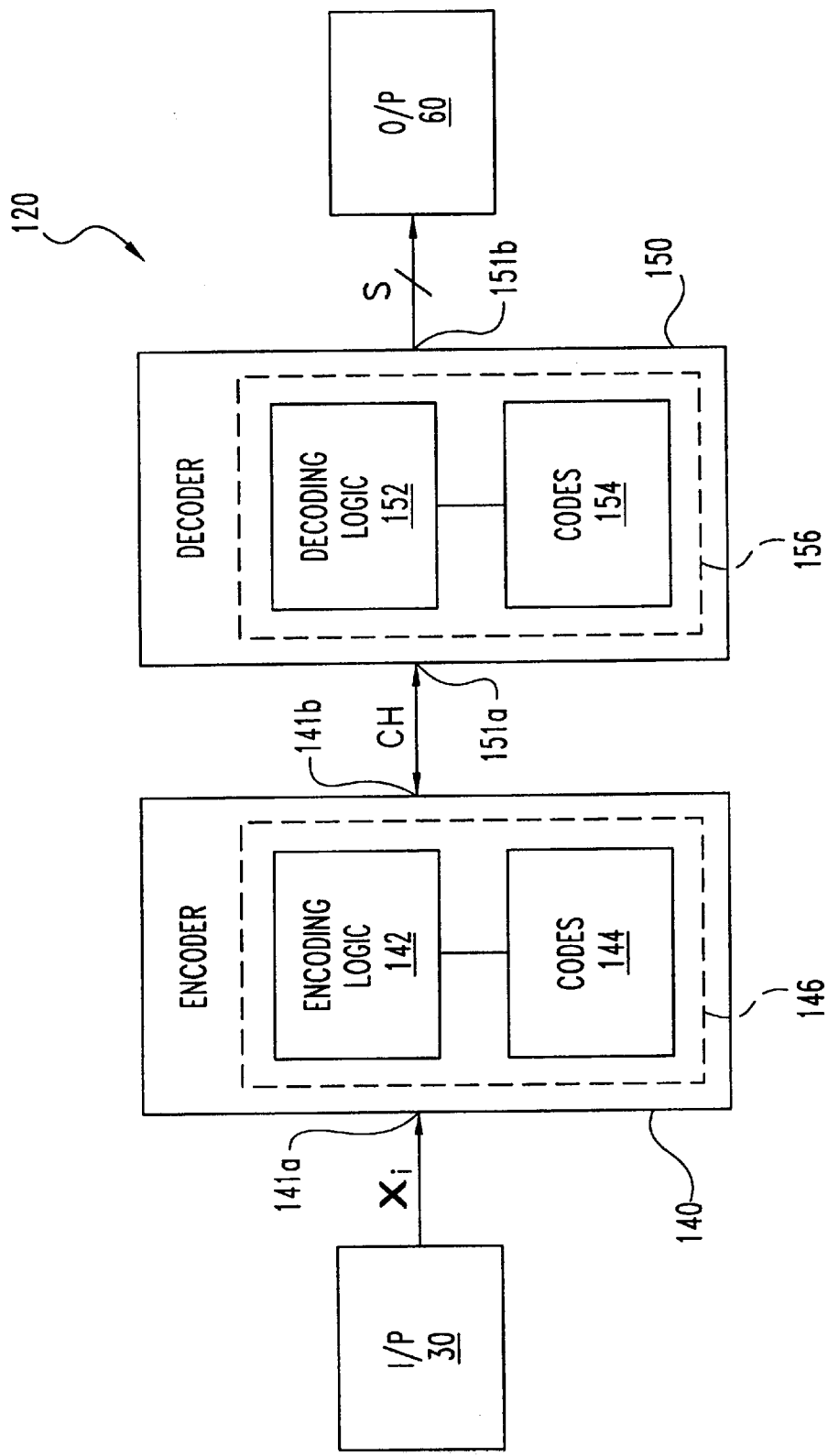
FIG. 5 is a schematic view of another communication system.

FIGS. 5–8 schematically depict another embodiment of the present invention; where like reference numerals refer to like features previously described in connection with system 20. Referring specifically to FIG. 5, communication system 120 is illustrated. System 120 include at least one input device (I/P) 30 operatively coupled to encoder 140. Encoder 140 is operatively coupled to decoder 150 via communication channel CH. Decoder 150 is operatively coupled to at least one output device (O/P) 60. Encoder 140 includes encoding logic 142 and codes 144.

Figure 6:
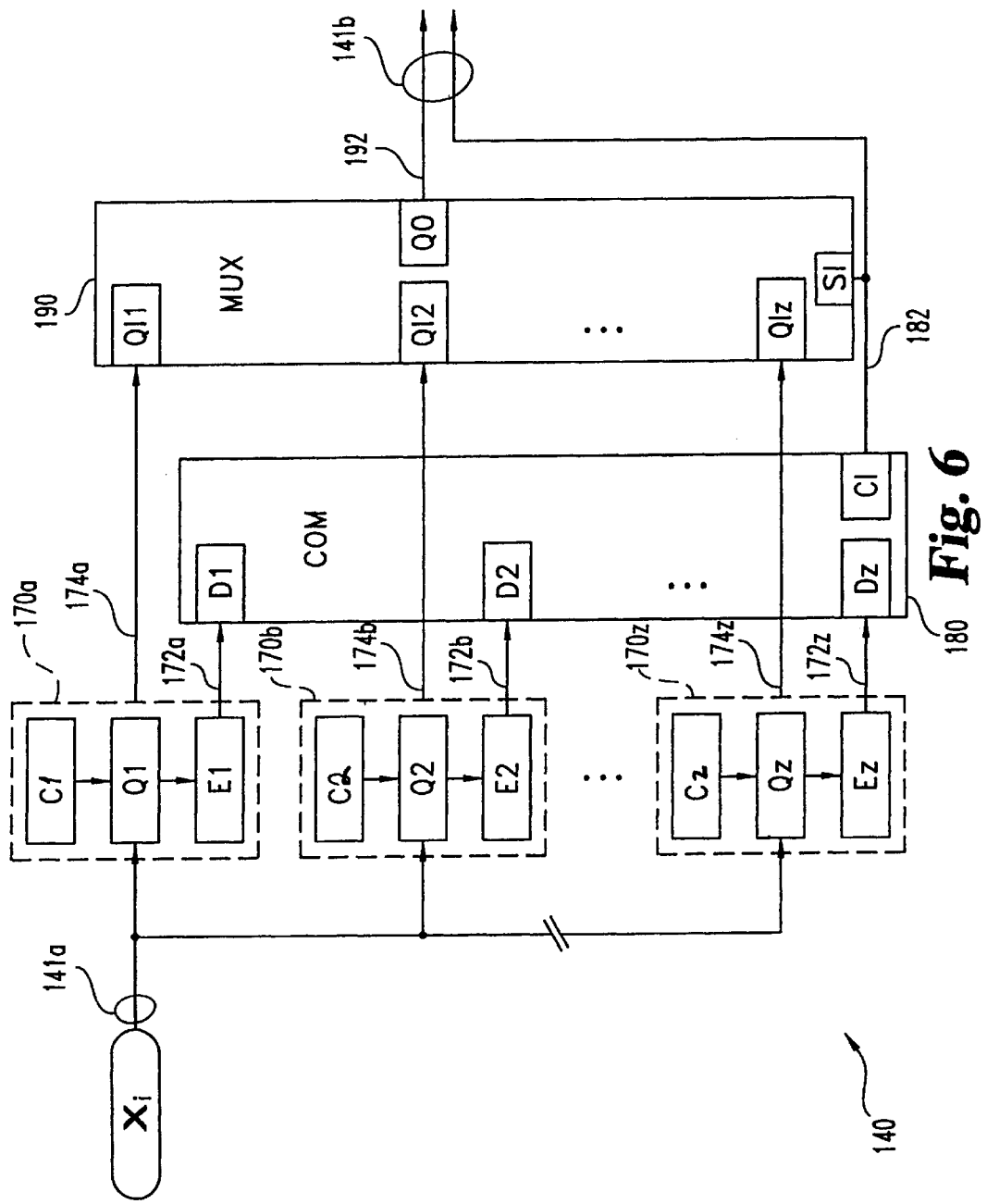
FIG. 6 is a schematic view showing selected details of an encoder of the system depicted in FIG. 5.

Referring also to FIG. 6, selected details of a preferred arrangement of encoding logic 142 and codes 144 of encoder 140 are depicted. Encoder 140 has input 141a operatively coupled to a number of processing units 170a, 170b, . . . , 170z (alternatively designated 170a–170z); where, as in the case of system 20, "z" is an alternative designation for $2^\eta$. Also, units 170a–170z are collectively designated as units 170. Each unit 170a–170z has a code source C1, C2, . . . , Cz (alternatively designated C1–Cz); quantizer Q1, Q2, . . . , Qz (alternatively designated Q1–Qz); and evaluation unit E1, E2, . . . , Ez (alternatively designated E1–Ez), respectively. Units 170a–170z are each operatively coupled by a corresponding signal path 172a, 172b, . . . , 172z (alternatively designated 172a–172z) to comparator 180. Units 170a–170z are also each operatively coupled by a corresponding signal path 174a, 174b, . . . , 174z (alternatively designated 174a–174z) to multiplexor 190. Ellipses are used in the description and figures in connection with system 120 in the same manner as described for system 20. Furthermore, it should be understood that in alternative embodiments, fewer than three units 170 may be utilized in alternative embodiments, corresponding to η being less than 2.

Figure 7:
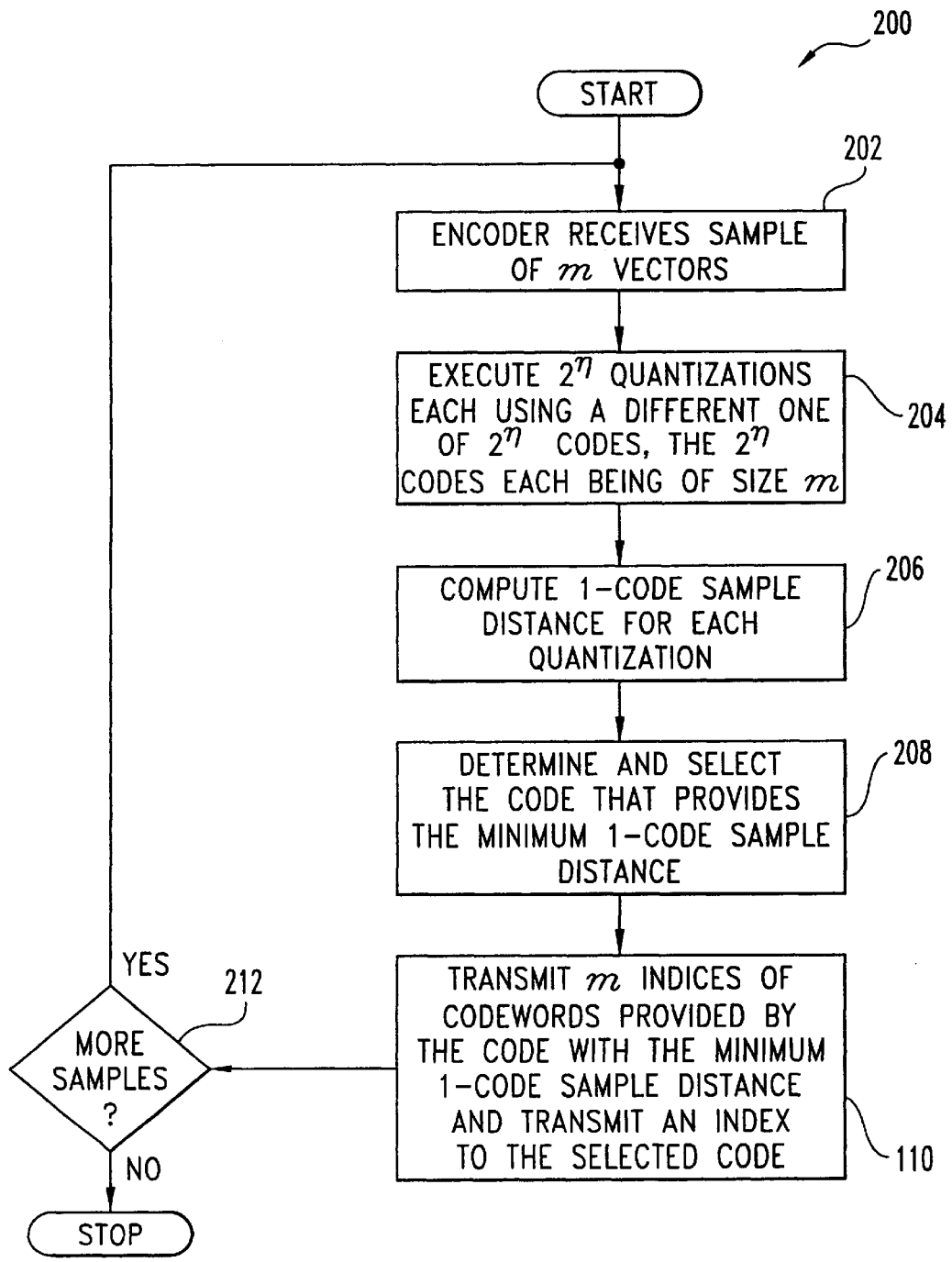
FIG. 7 is a flow chart illustrating an encoding process executed by the system of FIG. 5.
Figure 8:
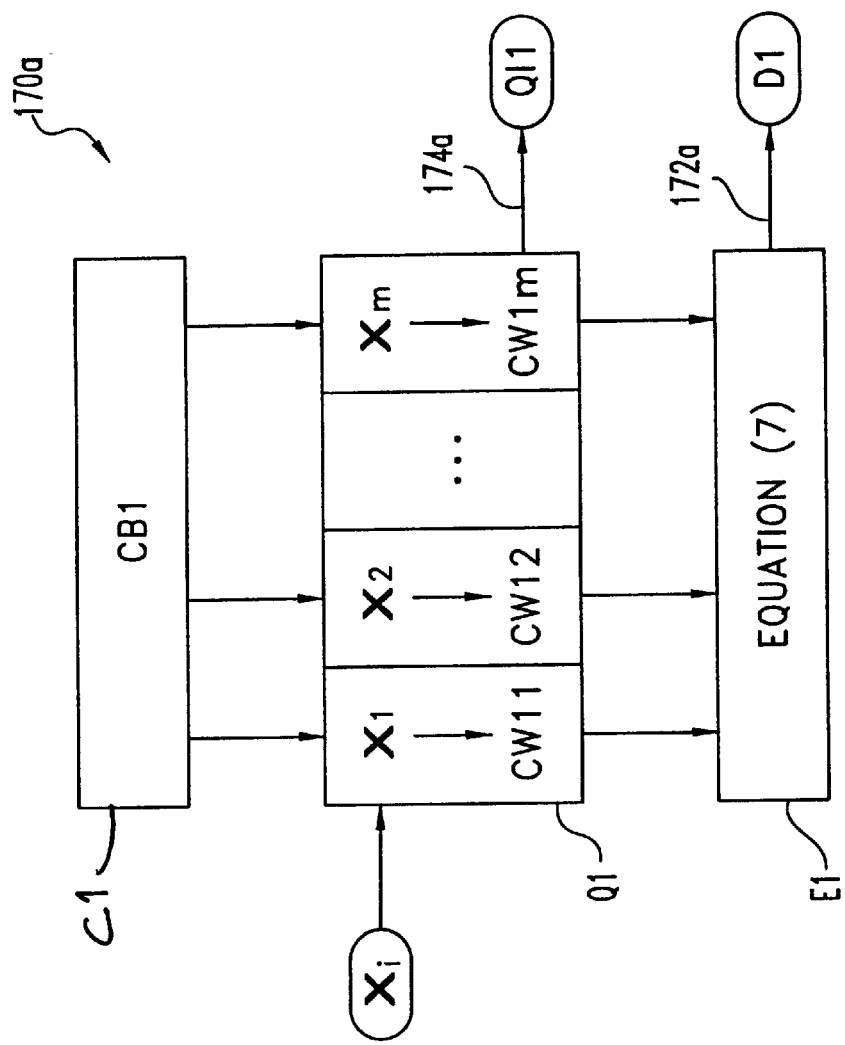
FIG. 8 is a schematic view showing selected details of a processing unit of the encoder depicted in FIG. 7.

In FIG. 7, one embodiment of encoding process 200 for system 120 is shown. Process 200 begins with the sequential entry of the vector sample $\mathbf{X}^\omega_i$ for i=1 to m (alternatively designated X1–Xm) into encoder 140 via input 141a in operation 202. Each of quantizers Q1–Qz of encoder 140 receives the m vectors of the sample during operation 202. Referring also to FIG. 8, selected details of a representative unit 170a, are further depicted. For unit 170a, code source C1 is a single code or codebook CB1 that is supplied for quantization of each of the m vectors X1–Xm received by quantizer Q1. In operation 204, quantizer Q1 of unit 170a quantizes each of the m vectors X1–Xm using codebook CB1 of code source C1 in accordance with equation (1); where codebook CB1 corresponds to the term $C^i_n$ ($C^i_n \in \mathbf{C}_n$=class of all n-level codes) for i=1 to m. As a result of this quantization, quantizer Q1 provides a corresponding set of selected codewords CW1, CW2, . . . , CWm (alternatively designated CW1–CWm) representative of the group of m vectors of the sample. Each member of the set of m codewords CW1–CWm is represented by an index to the corresponding codebook CB1. These m codebook indices are output by quantizer Q1 along signal pathway 174a as quantizer index input QI1 to multiplexor 190. Codewords CW11–CW1m are also provided to evaluation unit E1.

During operation 204, each of the remaining quantizers Q2–Qz also quantize vectors X1–Xm in accordance with equation (1) each using the single corresponding codebook CB2–CBz from the respective code source C2–Cz. Correspondingly, quantizers Q2–Qz each provide a set of codewords representative of the m vectors X1–Xm to a respective evaluation unit E2–Ez and provide a corresponding m number of codeword indices on each corresponding signal path 174b–174 z to a respective quantizer index input QI2–QIz of multiplexor 190.

Operation 204 provides for $2^\eta$ quantizations with indices to the resulting codewords being output by quantizers Q1–Qz on signal paths 174a–174z to quantizer index inputs QI1–QIz of multiplexor 190. Also, each evaluation unit E1–Ez receives a set of m codewords from a corresponding one of quantizers Q1–Qz. In operation 206, evaluation units E1–Ez each compute a single code sample distance (alternatively designated a 1-code sample distance) in accordance with equation (7) as follows:

$$D_r(C, F^\omega_m) = \int \|x - Q_C(x)\|^r dF^\omega_m(x) := \frac{1}{m}\sum_{i=1}^{m} \|X^\omega_i - Q_C(X^\omega_i)\|^r, \quad (7)$$

for a code $C \in \mathbf{C}_n$; where C corresponds to codebooks CB1–CBz for each respective evaluation unit E1–Ez. In equation (7), $F^\omega_m$ is the empirical distribution function (d.f) constructed by placing equal masses at each of the m vectors of the sample $\mathbf{X}^\omega_i$ for i=1 to m, and typically is quite different from one vector sample to the next with high probability (especially if m is chosen to be small). This procedure generally places an equal importance on each of the m vectors of the sample in terms of its contribution to the d.f. as more fully described in P. Bilingsley, *Probability and Measure*. New York: John Wiley & Sons, 1995, 3$^{rd}$. Ed.

The 1-code sample distance of each evaluation unit E1–Ez is provided along corresponding signal paths 172a–172z as a respective distortion level input D1–Dz to comparator 180. In operation 208, comparator 180 determines which distortion measure D1, D2, . . . , or Dz is lowest and provides a numerical representation of the quantizer providing the codeword set with the lowest distortion relative to the other codeword sets in the form of a code index CI. For 1-SACS, CI indicates which of the finite codebooks CB1–CBz provides the lowest distortion for the quantized sample of m vectors. Code Index CI is output along signal path 82 to selection input SI of multiplexor 190. Also input into multiplexor 190 are the quantizer indices via quantizer index inputs QI1–QIz. Multiplexor 190 is configured to route the quantizer indices to output QO that correspond to the quantization with the lowest relative distortion measure based on the code index CI provided to input switch input SI.

In operation 210, the output QO of multiplexor 190 along signal path 192 and the code index output CI of comparator 180 along signal path 182 collectively provide the encoded data for transmission through output 141b of encoder 140 to channel CH. Preferably, data received and transmitted by encoder 140 is in a binary format with logic 142 being of a digital variety. Correspondingly, codes 144 are preferably utilized in a binary format and stored in a digital memory associated with encoder 140. For these preferences, it should be appreciated that code index CI may be represented on signal path 182 by η bits. For the sample of m vectors processed by encoder 140, the signal routed along pathway 192 includes an index to the appropriate codeword of the selected codebook for each vector represented. Taking n as the length of each codeword in bits, each codeword index may be represented by $\log_2(n)$ bits. Thus, the output of multiplexor 90 for the m group of vectors $X_i$ may be represented by $m(\log_2(n))$ bits.

At conditional 212 of encoding process 200, it is determined whether there is an additional vector sample to encode. If there is an additional sample, then control flows back to operation 202 to receive the next sample for processing in accordance with the series of operations 204, 206, 208, 210. If there are no more samples to encode, process 200 terminates. Alternatively, process 200 may enter an idle loop until another sample requires encoding or operation of system 120 is terminated.

Because system 120 utilizes $2^\eta$ codes as opposed to the $m2^\eta$ codes of system 20, system 120 finds application where memory resources are unable to accommodate the larger relative number of codes utilized by system 20. Indeed, the one code per quantizer approach of system 120 is designated as a one code sample adaptive coding scheme or 1-SACS. The 1-SACS approach facilitates tailoring an appropriate code for a given sample by choosing a code from an optimally designed finite class of codes, where the code minimizes the 1-code sample distance of equation (7) within the class. If there are $2^\eta$ codes for the sample adaptation, the resultant distortion of 1-SACS is given by equation (8) as follows:

$$E \min_{C \in C_n^\eta} D_r(C, F_m), \qquad (8)$$

where the code class $C^\eta{}_n \subset \mathbf{CC}_n$ is a class of $2^\eta$ distinct codes. It should be appreciated that the bit rate for 1-SACS is the same as that for m-SACS given by equation (6). Further, it should be noted that one preferred embodiment of 1-SACS utilizes just two different codebooks corresponding to $2^\eta=2$ (in other words, $\eta=1$), resulting in two units 170 and correspondingly, two code sources Referring generally to FIGS. 1 and 5, decoders 50, 150 are configured with decoding logic 52, 152 to receive and decode the code index CI and the m number of quantizer indices from channel CH via input 51a, 151a. Codes 54, 154 of decoders 50, 154 are preferably a duplicate of codes 44, 144 and are arranged in a manner corresponding to m-SACS, 1-SACS, respectively. Selected details concerning the decoding for both systems 20, 120 are depicted as decoding process 250 in the flow chart of FIG. 9. In operation 252 of process 250, decoders 50, 150 each receive encoded data via channel CH in the form of indices corresponding to the m vector sample quantized by a respective one of encoders 40, 140. In operation 254, decoders 50, 150 determine the appropriate code sequence or codebook, respectively, needed to reconstruct data representative of the vector sample. In the case of decoder 50, the m vectors of the sample are reconstructed using the selected code sequence in operation 256. In the case of decoder 150, the m vectors of the sample are reconstructed using the selected codebook in operation 256. The reconstructed vectors are then provided by decoder 50, 150 as one or more signals S to one or more output devices 60 during operation 258. Control then flows to conditional 260 which determines if there is additional encoded data to process. If additional encoded data is detected, control loops back to re-execute operations 252, 254, 256, 258; otherwise process 250 terminates. Alternatively, process 250 may enter an idle loop or sleep mode until more encoded data is detected or operation of system 120 terminates.

Encoder 40, 140 and decoder 50, 150 are each preferably provided in the form of electronic circuitry components suitable for interfacing with input device 30 and output device 60, respectively, and are also preferably configured with circuitry suitable for interfacing to each other via channel CH. Encoding logic 42, 142 and decoding logic 52, 152 are preferably provided by dedicated hard-wired digital circuitry; however programming by firmware or software, or a combination of dedicated and programmable logic may be utilized as would occur to one skilled in the art. Codes 44, 54, 144, 154 are each preferably provided as look-up tables in electronic memory devices compatible with corresponding logic; however, other arrangements for codes 44, 54, 144, 154 may be used as would occur to one skilled in the art. Preferably, encoder 40, 140 and decoder 50, 150 are each provided as a single integrated circuit device using standard digital integration techniques. In the case of encoder 40, 140 reference numeral 46, 146 diagrammatically represents an integrated circuit embodiment including encoding logic 42, 142 and codes 44, 144. In the case of decoder 50, 150 reference numeral 56, 156 diagrammatically represents an integrated circuit embodiment including decoding logic 52, 152 and codes 54, 154. Channel CH may be provided using techniques known to those skilled in the art including a fiber optic coupling, an electrically conductive coupling, a wireless link, or any combination of these approaches.

It should be appreciated that while it is preferred that the present invention be utilized to quantize vector data, it is also envisioned that scalar data may be processed in accordance with the present invention. It has been found that the performance of m-SACS lies between that of k-dimensional vector quantization (VQ) and km-dimensional vector quantization (VQ). Further, for m-SACS, appropriate selection of n and $\eta$ results in a sample-adaptive distortion that is equal to the distortion of the km-dimensional VQ. Indeed, as the sample size m is increased, m-SACs distortion converges toward the theoretically obtainable minimum distortion. Commonly owned U.S. Provisional Patent Application No. 60/070,730 to Kim et al., filed 8 Jan. 1998, is cited as an additional source of information establishing these observations.

Figure 10:
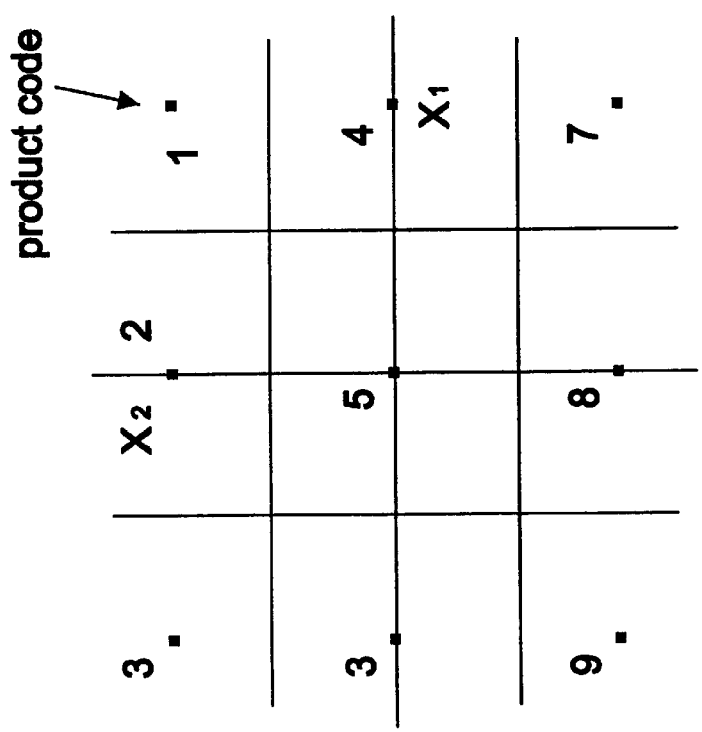

By observing Voronoi partitions of SACS relative to IICS in km-dimensional space, additional insight into the superior performance of SACS may be observed. For IICS described in terms of a an quantizer, the Voronoi regions generated by the product codes in $C^n{}_{m,v}$ are rectangular in the corresponding vector space $\mathbb{R}^{km}$ as shown in FIG. 10 (for simplicity of illustration, the scalar quantizer case, i.e., k=1, is considered); where for the a km quantizer $C_{m,v}$ denotes the class of all $v^m$-level product codes with $C^i{}_v \in \mathbf{C}_v$. For FIG. 10, m=2 and v=3. Thus, the product code size is 9.

Figure 11:
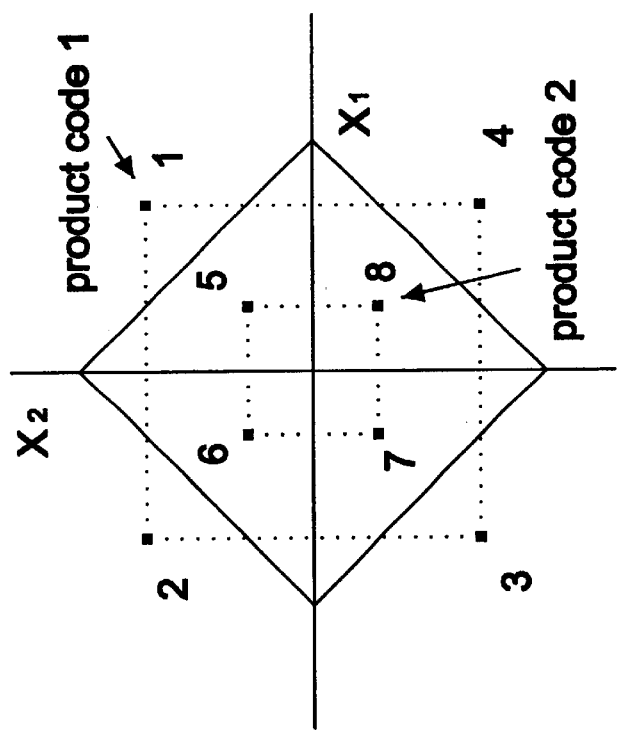
FIGS. 10 and 11 are graphs of Voronoi partitions in km-dimensional space for IICS with parameters m=2, v=3 and SACS with parameters m=2, n=2, η=1; respectively.

On the other hand, for a SACS quantizer, because the product code in $C_{m,n}$ is composed of several different sub-product codes, the Voronoi regions may have different shapes than the rectangles of the IICS case, as illustrated in FIG. 11. For the SACS case of FIG. 11, m=2, n=2, and $\eta=1$, with codewords 1 through 4 belonging to the first sub-product code and codewords 5 through 8 belonging to the second sub-product code. Consequently, it is possible to make a Voronoi partition such that each Voronoi region yields lower average distortion than the rectangular region for a given volume of the Voronoi region, further indicating that m-SACS will achieve a smaller average distortion than IICS. Moreover, it should be appreciated that the sub-product codes can be efficiently assigned to the joint d.f. of the random vector in $\mathbb{R}^{km}$, even if the random variables are dependent.

In the case of 1-SACS, it has found that increasing m while keeping the sample ratio $\beta=m/n$ small (i.e. increasing the code size n as well), will allow for very efficient adaptation, and performance that is virtually identical to the m-SACS case. Commonly owned U.S. Provisional Patent Application No. 60/070,730 to Kim et al., filed 8 Jan. 1998, is cited as an additional source of information establishing these observations.

Among other findings and observations regarding the performance of both m-SACS and 1-SACS, is a reduced complexity relative to other techniques. For example, it has been found that for a large bit rate R with a fixed ratio of $\eta/m$, the complexity of the k-dimensional VQ is $O(2^{Rk})$, while for SACS, the complexity is only $O(2^R)$, i.e., the same order as a scalar quantizer. Another complexity related aspect may be considered in terms of the number of processing elements (PEs) needed in an integrated circuit implementation, such as might be provided in the form of a Very Large Scale Integration (VLSI) or Application Specific Integrated Circuit (ASIC) device. For the k-dimensional non-adaptive VQ case, $2^{Rk}$ processing element (PE) pairs are needed; where the first one calculates distances and the other compares the distances. However, for SACS, only $2^{R+\eta}$ PE pairs are required. If distances measures for SACS are provided by a lookup table in digital memory, SACS may be implemented in terms of $2^\eta$b output bits with a b bit address; where b is the word length in bits of input data. In contrast, a non-adaptive VQ needs bk output bits with a bk bit address.

Furthermore, a number of different lattice-based vector quantizers in m-dimensional space may be constructed using SACS with k=1. A lattice VQ is a uniform quantizer with output that is a truncated root lattice. J. D. Gibson and K. Sayood, "Lattice Quantization," *Advances in Electronics and Electron Physics*, vol. 72, pp. 259–330, Academic Press, 1988 is cited as a source of additional information regarding lattice quantizers. An m-dimensional lattice is defined by a set of points in $\mathbb{R}^{m'}$ according to equation (9) as follows:

$$\Lambda := \{x | x = Up, p \in \mathbb{Z}^m\}, \tag{9}$$

where the m'×m matrix $U=(u_1 \ldots u_m)$ is a generator matrix for $\Lambda$, $u_i (\in \mathbb{R}^{m'})$ are linearly independent vectors, and $m \leq m'$. Let the Voronoi regions that are constructed by the lattice $\Lambda$ have the shape of some polytope P with centroid $x_o$. Then $G(\Lambda)$, the normalized second moment of P is defined by equation (10) as follows:

$$G(\Lambda) := \frac{1}{m} \frac{\int_P \|x - x_o\|^2 dx}{\left(\int_P dx\right)^{(m+2)/m}}. \tag{10}$$

The quantity $G(\Lambda)$ determines the performance of a lattice VQ using the mean square error (MSE) distortion measure. For example, the hexagonal lattice $A_2$ has a MSE distortion of $G(A_2) \approx 0.0802$ and is the optimal 2-dimensional lattice quantizer for uniformly distributed data, while the rectangular lattice has an MSE distortion of $12^{-1} \approx 0.0833$. The second moments of various lattices have been calculated that yield close values to $\min_\Lambda G(\Lambda)$ for various dimensions. Generally, a VQ based on various desirable lattice types may be constructed using SACS as are summarized in Table I of FIG. 12. J. H. Conway and N. J. A. Sloane, "On the Voronoi regions of certain lattices," *SIAM J. Alg. Discrete Methods*, vol. 5, no. 3, pp. 294–305, September 1984 is cited as a source of additional information regarding preferred lattices.

For sets $\Lambda^{i,j} \subset \mathbb{R}$, i=1, . . . , m, j=1, 2, . . . $2^\eta$, assume that card ($\Lambda^{i,j}$)=card ($\mathbb{Z}$) and $\mathbb{L}^\eta_m$ is the class of all sets that have the product form:

$$\cup_{j=1}^{2^\eta} (x_{i=1}^m \Lambda^{i,j}).$$

where:

$$(x_{i=1}^m \Lambda^{i,j})$$

is a coset of a rectangular lattice and the sub-product code of m-SACS is a subset of this coset. Let two lattices H and I be "equivalent", as designated by the expression H≅I, if they differ only by a rotation and possibly a change of scale.

The first type of lattice considered in Table I of FIG. 12 is the $A_m$ lattice. Note that the $A_2$ lattice has been shown to be optimal in two dimensions (i.e. VQ based on this lattice minimizes the mean square error distortion). As described in Table I, the $A_2$ and $A_3$ lattice vector quantizers may be described by m-SACS with $\eta=1$. Further, there exists rotated versions of $A_2$ and $A_3$ that belong to $\mathbb{L}_2^1$ and $\mathbb{L}_3^1$, respectively. For $m \geq 1$, $A_m$ is the m-dimensional lattice consisting of the points $x=(x_o, x_1, \ldots x_m)$ having integer coordinates that sum to zero in accordance with equation (11) as follows:

$$A_m := \left\{ x \in \mathbb{Z}^{m+1} : \sum_{i=0}^m x_i = 0 \right\}. \tag{11}$$

Let $A_m^\perp$ denote the dual lattice of $A_m$. then equation (12) follows:

$$A_1 \cong A_1^\perp \cong \mathbb{Z}. \tag{12}$$

where:

$$A_2(\cong A_2^\perp)$$

is the hexagonal lattice and can be generated by the basis vectors $u_1=(1, -1, 0)^T$ and $u_2=(1,0, -1)$. Since $u_1$ and $(2u_2-u_1)$ are orthogonal, $u_1$ and $2u_2$ generate a rotated rectangular lattice $\Lambda$. Thus, equation (13) follows:

$$A_2 = \Lambda \cup (u_2 + \Lambda), \tag{13}$$

and it follows that there exists a lattice $\Lambda$ satisfying $A_2 \cong \Lambda \in \mathbb{L}_2^1$. In the 3-dimensional case, $A_3$ is the faced-centered cubic lattice and has three basis vectors, $(1, -1, 0, 0)^T$, $(1, 0, -1, 0)^T$, and $(1, 0, 0, -1)^T$. Applying the same approach as for the $A_2$ case, there is a lattice $\Lambda$ such that $A_3 \cong \Lambda \in \mathbb{L}_3^1$. Thus, a lattice VQ based on $A_2$ and $A_3$ may be described by m-SACS (m=2 and m=3, respectively), and by increasing $\eta$ a generalized lattice $A_m$ may be described for larger values of m.

The next lattice shown in Table I is $A_3^\perp$, which can also be shown to be an element of $\mathbb{L}_3^1$. It has been found that for m=3, the $D_m^\perp$ lattice discussed later is equivalent to the $A_3^\perp$ lattice, and hence it may be shown that $A_3^\perp \in \mathbb{L}_3^1$.

Other applicable lattice types are the $D_m$ lattices. For $m \geq 2$, $D_m$ consists of the points $(x_1, \ldots, x_m)$ having integer coordinates with an even sum. The generator matrix $U_D$ for lattice $D_m$ is given by equation (14) as follows:

$$U_D := \begin{pmatrix} 2 & 1 & 1 & \ldots & 1 \\ 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \end{pmatrix} \tag{14}$$

Hence, $D_m = \{x | x = U_D p, p \in \mathbb{Z}^m\}$. Let $D_{m,l}$ denote a sublattice of $D_m$ per equation (15) as follows:

$$D_{m,l} := \{x | x = U_D p', p' = (p_1, 2p_2 + l_o, 2p_3 + l_1, \ldots, 2p_m + l_{m-2})^T, p_1, \ldots, p_m \in \mathbb{Z}\}, \tag{15}$$

where $l = l_{m-2} 2^{m-2} + l_{m-3} 2^{m-3} + \ldots + l_o 2^o$ and $l = 1, 2, \ldots, 2^{m-1} - 1$. The lattice $D_m$ can then be rewritten as equation (30) as follows:

$$D_m = \bigcup_{l=0}^{(2^{m-1}-1)} D_{m,l} \quad (16)$$

$$= \bigcup_{l=0}^{(2^{m-1}-1)} (U_D(0, l_0, l_1, \ldots, l_{m-2})^T +$$

$$\{x \mid x = U_D(p_1, 2p_2, 2p_3, \ldots, 2p_m)^T, p_1, \ldots, p_m \in \mathbb{Z}\})$$

$$= \bigcup_{l=0}^{(2^{m-1}-1)} (r_l + \{\ldots, -4, -2, 0, 2, 4, \ldots\}^m),$$

where $r_1 := U_D(0, l_0, l_1, \ldots, l_{m-2})^T$. Since from equation (30), $D_m$ may be represented as the union of $2^{m-1}$ cosets of rectangular sub-lattices, and since one sub-lattice corresponds to a sub-product code in SACS, $2^{m-1} = 2^\eta$. Hence, the side information required in this case is $\eta = m-1$ which corresponds to the number of ones (1s) in the diagonal of $U_D$. this also means that $D_m \in \mathbb{L}^{m-1}_m$.

Another lattice of interest that is listed in Table I is the $D_m^\perp$ lattice. For $m \geq 2$, this lattice is the dual of the lattice $D_m$ defined as by equation (17) as follows:

$$D_m^\perp := \mathbb{Z}^m \cup \left(\left(\frac{1}{2}, \frac{1}{2}, \ldots, \frac{1}{2}\right)^T + \mathbb{Z}^m\right). \quad (17)$$

from which the following relationship is clear:
$$D_m^\perp \in \mathbb{L}_m^1.$$

This relationship indicates that 1-SACS can construct the $D_m^\perp$ lattice with $\eta=1$. Further, it also indicates that 1-SACS with $\eta=1$ may be utilized to construct the optimal lattice in 3 dimensions, since the $D_3^1$ lattice is a body-centered cubic lattice and optimal in 3-dimensions.

The next lattices shown in Table I of FIG. 12 are $E_7$ and $E_8$. VQs based on $E_7$ and $E_8$ result in mean square distortion that is very close to the lower bound on the distortion in 7 and 8 dimensions, respectively. Note that the diagonals of the generator matrixes of $E_7$ and $E_8$ have 3 and 4 ones (1s), respectively. Thus, analogous to the $D_m$ case, the following relationships result $E_7 \in \mathbb{L}_7^3$ and $E_8 \in \mathbb{L}_8^4$.

Lattice vector quantizers have a highly regular structure based on a lattice, which forms a regularly spaced array of points in $\mathbb{R}^m$. Due to this regularity, the encoding operation is simplified. For example, the encoding process of the lattice VQ based on the lattice $D^*_m$ can be described by 1-SACS with $\eta=1$, since $D^*_m \in \mathbb{L}_m^1$. Note that 1-SACS with $\eta=1$ requires only two scalar codes. In other words, in this embodiment, two different scalar quantizers quantize m points of a sample independently and the index of the quantizer that yields the minimum distortion is transmitted. For example, if the code size is 4 the two codes for the scalar quantizers can be $\{1,2,3,4\}$ and $\{1.5, 2.5, 3.5, 4.5\}$. SACS is a unifying encoding scheme for several root lattices. Moreover, vector quantization based on many different root lattices can be treated by the very simple operation of scalar quantization in SACS.

Yet another alternative aspect of the present invention is a code class design process for use with SACS that further reduces distortion for a given bit rate $R=(\log_2 n)/k+\eta/mk$, vector dimension k, and m, n, $\eta$, parameters. In order to find an optimal code class of $2^\eta$ codes for 1-SACS, a large number of m vector samples in the form of a training sequence (TS) are utilized. The design process may be extended to determine the $m2^\eta$ codes for m-SACS using techniques known to those skilled in the art. The code design process iteratively refines an initial code class $C^\eta_n$ by focusing on the sample-adaptive distortion relationship given by the following equation (18):

$$\inf_{C^\eta_n \subset C_n} \left[ E \min_{C \in C^\eta_n} D_r(C, F_m) \right], \quad (18)$$

for given values of m, n, and $\eta$.

Let $(x_{1l}, \ldots x_{ml})$ denote the lth sample in a given set of M samples, where a sample has m training vectors. The first part of the process quantizes m training vectors in each sample using $2^\eta$ different codes and then selects a code that yields the minimum 1-code sample distance in accordance with equation (7) for a sample. The second part of the process updates the codes using the partitioned TS in the quantization process of the first part. These two parts are then iteratively applied to the given TS.

Figure 13:
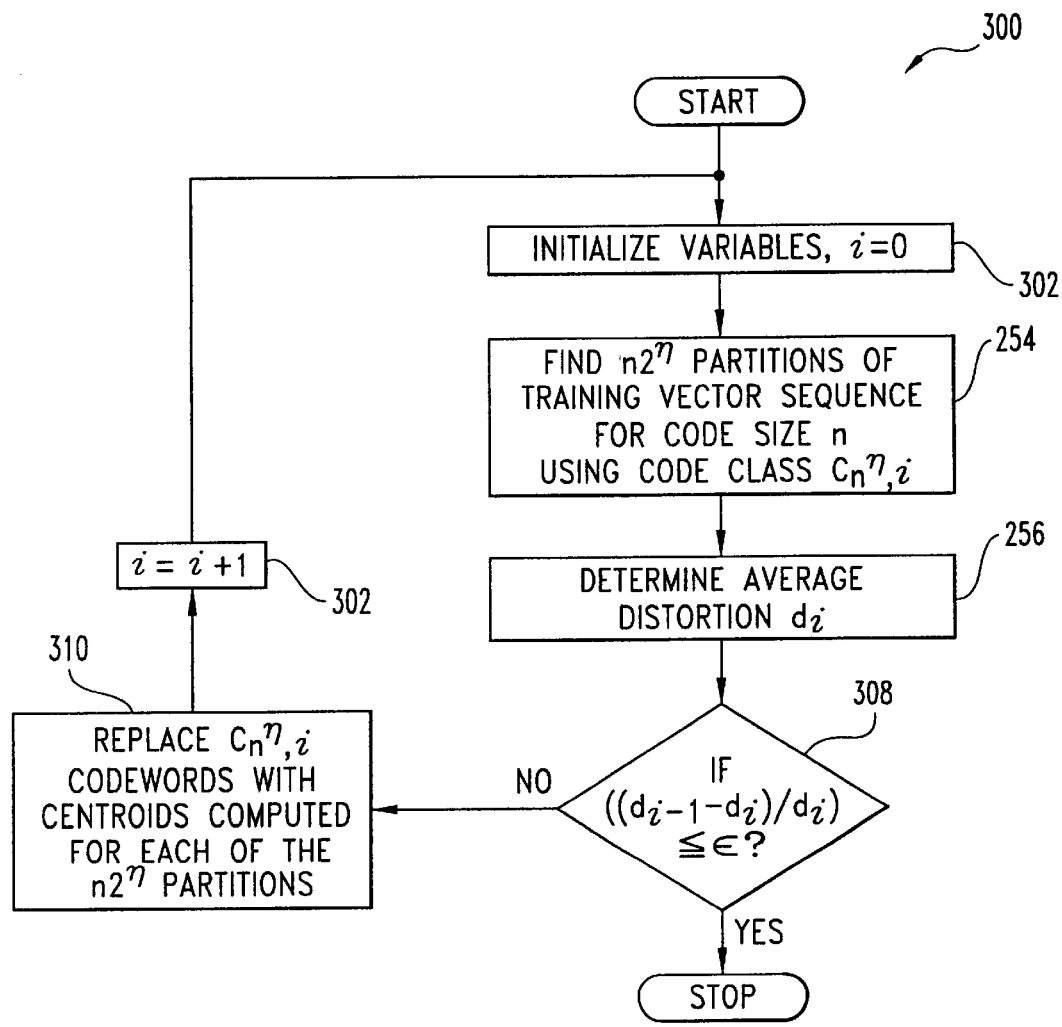
FIG. 13 is a flow chart showing a code class design process of the present invention.

Referring to FIG. 13, one embodiment of a code determination process 300 of the present invention is described. Preferably, process 300 is performed by executing a program embodying process 300 on a suitable computer. This program may be generated using standard techniques known to those skilled in the art. Process 300 starts with the initialization of variables in operation 302. Operation 302 includes setting i, an iteration counter, to 0 (i=0) and establishing a desired code size n, sample size m, number of codes $2^n$, distortion threshold $\in \geq 0$, initial code class $C^\eta_{n,0}$, and the TS for l=1 to M. Also average distortion $d_i$ is set such that $d_{-1}=\infty$. Control then flows to operation 304.

In operation 304, $n2^\eta$ partitions of each sample of training vectors in the TS are determined for the corresponding $n2^\eta$ codewords for the given $C^\eta_{n,i}$, where each training vector's codeword is determined by equation (19) as follows:

$$C_{(l)} := \arg \min_{C \in C^\eta_{n,i}} \frac{1}{m} \sum_{j=1}^{m} \|x_{jl} - Q_C(x_{jl})\|^r \text{ for } l = 1, \ldots, M. \quad (19)$$

Next, in operation 306 of process 300, average distortion, $d_i$ is determined in accordance with equation (20) as follows:

$$d_i := \frac{1}{M} \sum_{l=1}^{M} \frac{1}{m} \sum_{j=1}^{m} \|x_{jl} - Q_{C_{(l)}}(x_{jl})\|^r. \quad (20)$$

After operation 306, conditional 308 is encountered which tests whether the change in distortion is equal to or below the limit set by threshold $\in$ in accordance with the relationship $(d_{i-1}-d_i)/d_i \leq \in$. If the relationship for conditional 308 is satisfied, process 300 terminates with the current $C^\eta_{n,i}$ being the final code class. If the relationship for conditional 308 is not satisfied, process 300 continues with operation 310. In operation 310, the current codewords of $C^\eta_{n,i}$ are replaced with centroids determined for each of the $n2^\eta$ partitions. Next operation 312 is performed which increments i (i=i+1). After i is incremented, control loops back to operation 304. Process 300 continues to execute the loop comprising operations 304, 306, 310, 312 continues until conditional 308 is satisfied, resulting in a final code class with an acceptable minimum distortion for the given TS.

It should be appreciated that the average distortion of the TS given by equation (20) is an estimate of the sample-adaptive distortion of equation (8). The average distortion $d_i$ is a decreasing sequence, and thus, $d_i$ converges to a (local) minimum, dependent on the initial code class $C^\eta_{n,o}$. Because convergence to a global minimum may not always result, considered selection of the initial code class may improve the code design.

Figure 14:
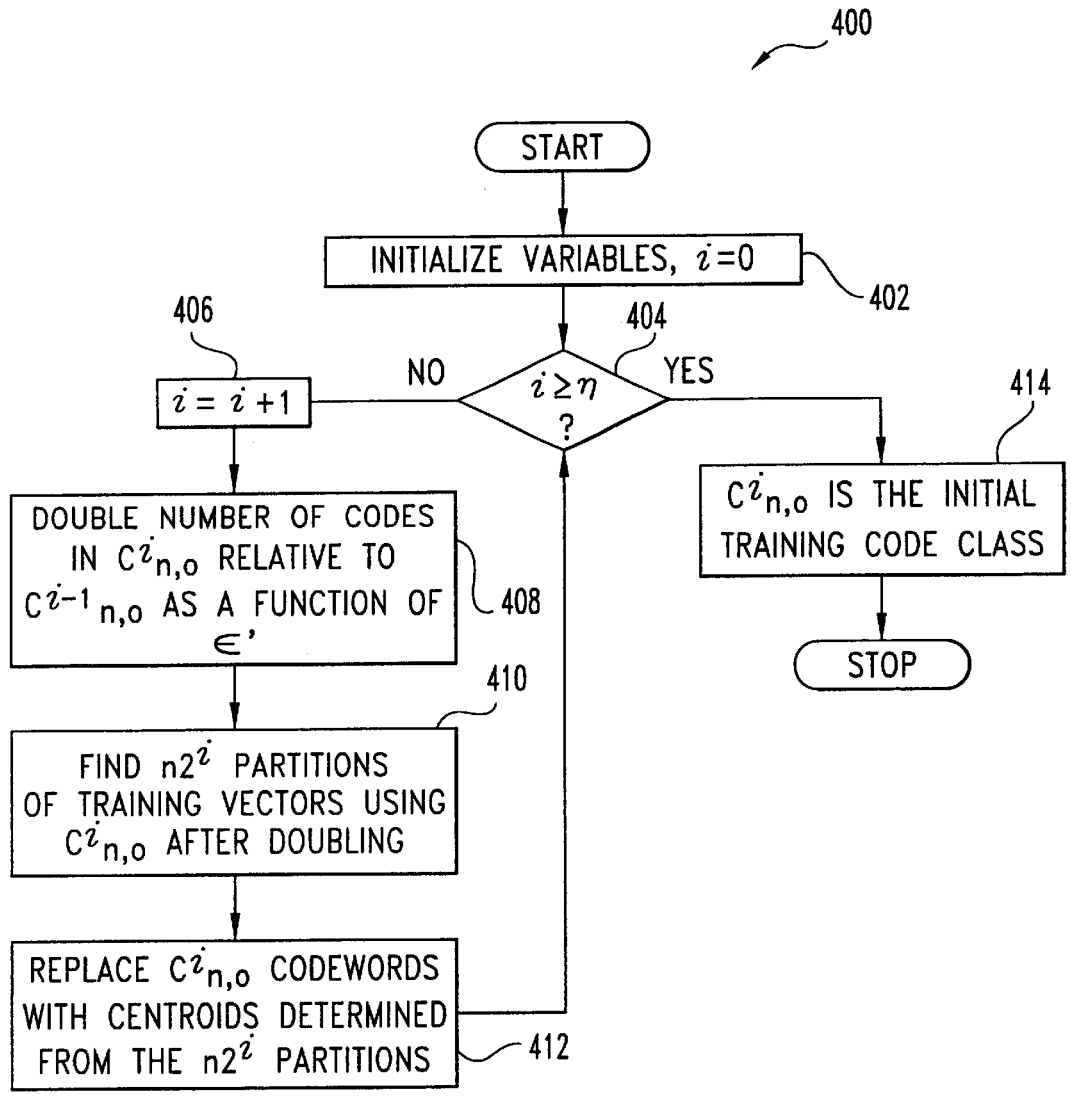
FIG. 14 is a flow chart showing an initial code class determination process.

The flow chart of FIG. 14 illustrates process 400 of one embodiment for determining a code class that may be utilized as the initial code class for process 300. Like process 300, it is preferred that a suitable computer be programmed to execute process 400 using standard techniques known to those skilled in the art. Process 400 begins with operation 402. In operation 402, iteration counter i is set to 0 (i=0), and code size n, the number of $2^\eta$ codes to be generated, the split constant $\in'$, and the TS for l=1 to M are established. For operation 402, the initial code class $C^0_{n,0}$, is established with only one code which is the F-optimal (or suboptimal) code.

After operation 402, process 400 proceeds to conditional 404 which tests whether i≥η. If conditional 404 is not satisfied, process 400 proceeds to operation 406 to increment i (i=i+1). Next, operation 408 is encountered. In operation 408, a new code class $C^i_{n,0}$, is generated by doubling the number of codes in the class $C^{i-1}_{n,0}$ as follows: (a) the first $2^{i-1}$ codes of $C^{i-1}_{n,0}$ are given by subtracting $\in'$ from all the elements of the codewords in $C^{i-1}_{n,0}$; and (b) the next $2^{i-1}$ codes of $C^i_{n,-0}$ are given by adding $\in'$ to all the elements of the codewords in $C^{i-1}_{n,0}$.

Next, operation 410 is performed. In operation 410, for the current $C^i_{n,0}$, the corresponding $n2^i$ partitions of training vectors of the sample are found according to equation (21) as follows:

$$\min_{C \in C^i_{n,0}} \frac{1}{m} \sum_{j=1}^{m} \|x_{jl} - Q_C(x_{jl})\|^r, \text{ for } l = 1, \ldots, M. \quad (21)$$

After operation 410, process 400 proceeds to process 412 to determine the centroids of the $n2^i$ partitions of operation 410 and replaces the codewords in $C^i_{n,0}$ with these $n2^i$ centroids. Control then loops back to conditional 404 to retest for the condition i≥η. Until conditional 404 is satisfied, the sequence of operations 406, 408, 410, 412 is repeated. Once conditional 404 is satisfied, process 400 proceeds to operation 414 to establish the current code class $C^i_{n,0}$ as the initial code class, and then process 400 terminates.

In one embodiment of the present invention, a Sampled Adaptive Coding Scheme (SACS) is applied to provide for the optional Alternative INTER VLC mode described in Annex S of the H.263+ recommendation on Video Coding for Low Bitrate Communication. The H.263+ recommendation document, dated January 1998, is hereby incorporated by reference in its entirety. SACS is selectively applied to enhance coding performance when significant changes are evident in a picture corresponding to "busy" INTER blocks. Busy INTER blocks typically have a large number of large magnitude coefficients. SACS is utilized for the INTRA VLC table (TABLE I.2) option, Advanced INTRA Coding mode in Annex I of H.263+. The adaptive quantization scheme for such busy blocks is applied to improve the SNR as non-zero level quantizers (quantizers that have no zero-value reconstruction level) to obtain gains based on the vector quantization principle. The adaptive scheme has a 1-SACS type of the feed-forward adaptive quantizer with side information. This quantizer can be regarded as a structurally constrained vector quantizer. However, the encoding complexity is as low as that of the scalar quantizer. The proposed scheme can be applied to the current option, Alternative INTER VLC mode. Also, it is envisioned that further extensions of the application may be made to quantizers of H.263+.

In the proposed adaptive quantization scheme for H.263+, each block is first classified into two classes based on the Discrete Cosine Transform (DCT) coefficients of the block: (1) non-busy block class and (2) busy block class. Then, an adaptive quantization scheme is applied to the busy blocks only. Non-busy blocks use the standard quantizer of H.263+. The adaptive quantizer uses several non-zero level quantizers, where only the reconstruction levels are different from the original quantizers of H.263+. Note that the proposed scheme can be applied to any current option.

In a DCT block, the following terms are defined:

QP=quantizer parameter, $\hat{COF_i}$=a transform coefficient to be quantized, $\hat{LEVEL_i}$=the quantized version of the transform coefficient, $\hat{REC_i}$=reconstructed coefficient value, and "$\hat{/}$"=division by truncation, where i ($\in\{1, \ldots, 6\}$) is the index for the DCT coefficients.

The quantization rule, which yields $LEVEL_i$ for a variable length coder (VLC), is related to that of H.263+ for INTER coefficients by the following equation:

$$LEVEL_i = \text{sign}(COF_i) \cdot LEVEL'_i,$$

where $LEVEL'_i = (|COF_i| - QP/2)/(2 \cdot QUANT)$.

In order to introduce the inverse quantization rule, the following inverse quantizers are defined. The first inverse quantization rule, which is designated by $IQ_0$, is used for the non-busy blocks, where $IQ_0$: $REC_i = \text{sign}(LEVEL_i) \cdot REC'_i$, when $LEVEL_i \neq 0$ and $REC_i = 0$ otherwise, for i=1, ..., 64; where $REC'_i = QP \cdot (2 \cdot |LEVEL_i| + 1) - p$, and p=0 if QP is odd and p=1 otherwise. (Note that $IQ_0$ is the same as the inverse quantization rule for the INTER coefficients in H.263+).

The next rules will be used for the busy blocks in the sampled adaptive scheme. For j=1,2, ...,$2^\eta$, $IQ_j$: $REC_{i,j} = \text{sign}(LEVEL_i) \cdot REC'_i + c_{i,j}$, when $LEVEL_i \neq 0$ and $REC_{i,j} = d_{i,j}$ otherwise, for i=1, ...,64; where $REC'_i = QP \cdot (2 \cdot |LEVEL_i| + 1) + b_{i,j} - p$, and p=0 if QP is odd and p=1 otherwise. In the inverse quantizer $IQ_j$, $b_{i,j}$, $c_{i,j}$ and $d_{i,j}$ are integers, and j (η bits) is the side information. (Note that these parameters are dependent on i, the index for the DCT coefficient in a DCT block; and $|b_{i,j}|$ and $|c_{i,j}|$ should be even to ensure the odd values of $REC_i$.)

Let $D_j$ denote the average distortion for an adaptive block that is inversely quantized by $IQ_j$, where:

$$D_j \triangleq \frac{1}{64} \sum_{i=1}^{64} (COF_i - REC_i)^2, \text{ for } j = 1, 2, \ldots, 2^\eta.$$

The adaptation is performed by finding the quantizer that yields the minimum distortion $\min_j D_j$. The side information, η bits, are added to the bit stream of the busy block after the last coefficient so that the fixed length η bits are decodable. The quantizer parameter QP for the busy blocks may also adaptively be changed. In this case, $QP_{i,j}$, is used which is dependent on i and j, instead of a constant QP.

Classification techniques for finding the busy blocks include:

(1) counting the required bits for a block and classifying a block as "busy when the counted number of bits exceeds a given threshold; or (2) designating blocks as "busy" that use the INTRA VLC table for the Alternative INTER VLC mode (Annex S).

The first technique provides a classifier that does not change the VLC bit stream for the coefficients. The second criteria may be applied to the current option, Alternative INTER VLC mode, as a modification. If this option is modified by using the adaptive quantization scheme, then the SNR of the busy blocks may be improved in addition to reducing the required bits. U.S. Provisional Application No. 60/106,114 filed 29 Oct. 1998 is cited as a source of additional information regarding the H.263+ application of SACS and is hereby incorporated by reference in its entirety.

A number of experiments were conducted using computer simulations of various aspects of the present invention the results of which are described as follows. These experiments and results are intended to be illustrative of the present invention and should not be considered limiting or restrictive with regard to the scope of the present invention. Further, any theory of operation, proof, or finding stated herein is meant to further enhance understanding of the present invention and is not intended to make the scope of the present invention dependent upon such theory, proof, or finding.

Figure 15:
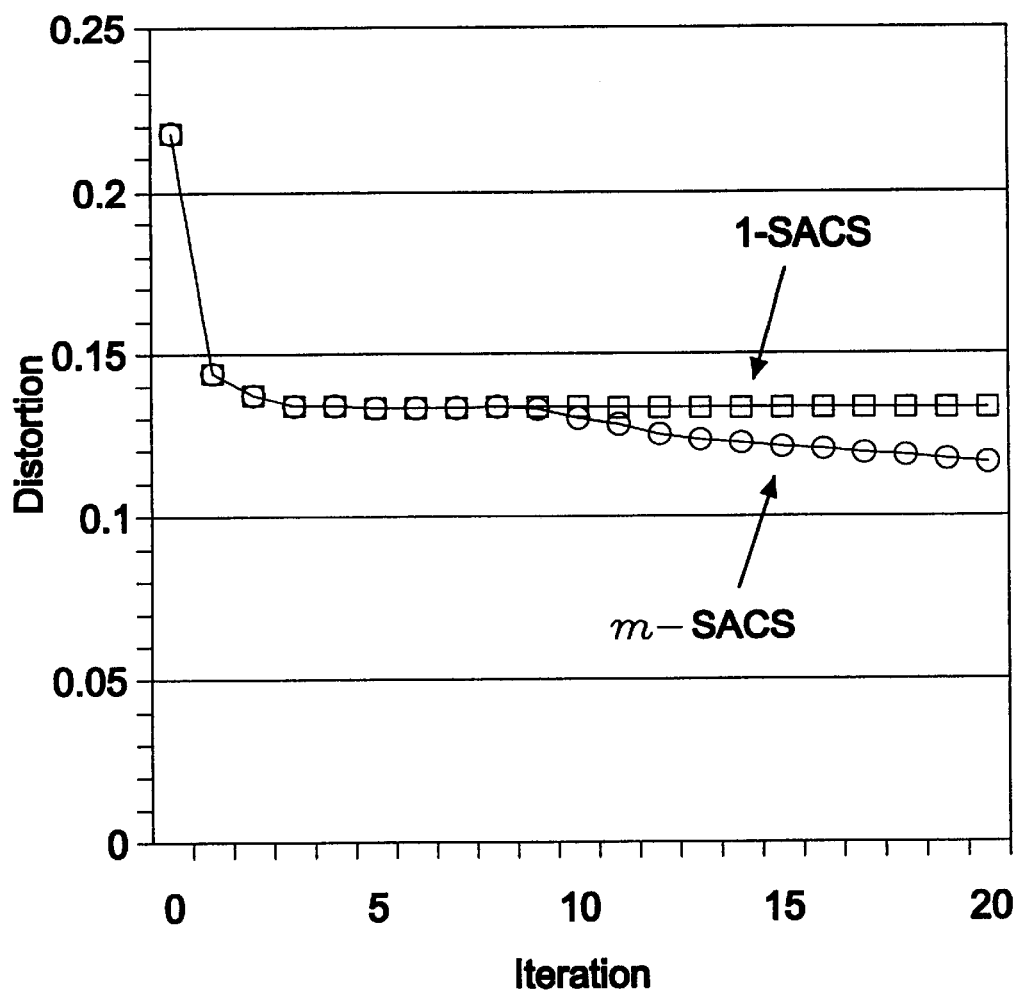
FIG. 15 is a graph comparing simulated sample adaptive distortion results of 1-SACS and m-SACS with respect to the number of iterations of the process of FIG. 13 at the bit rate 2 (the random vector source has a Gaussian distribution with variance 1, and the SACS parameters are m=2, n=2, and η=2.)

For the experimental results, synthetic data was used to represent a Gaussian i.i.d. source for all elements of the source $(X_i)^m_{i=1}$. In other words, all the random variables in $X_i$ for i=1 to m are independent and normally distributed with the same mean and variance. To ensure a good code design for the Gaussian source, more than 5000 training vectors per codeword were utilized. The mean square distortion measure is employed (i.e., r=2 in equation (1)). In FIG. 15 convergence of process 300 to a (local) minimum distortion (here m=2, n=2, and η=2) is illustrated, where the split constant is ∈'=0.001 was used to provide an initial code class in accordance with process 400. Because the initial code is the Lloyd-Max quantizer at n=2, the starting distortion $d_0$ in equation (20) is less than that of the Lloyd-Max (0.363). The distortion sequence of $d_i$ monotonically decreases with each iteration in both the m-SACS and 1-SACS cases. In the m-SACS case in FIG. 15, the distortions for the first several iterations follows that of 1-SACS, since process 400 was also employed for m-SACS.

Figure 16:
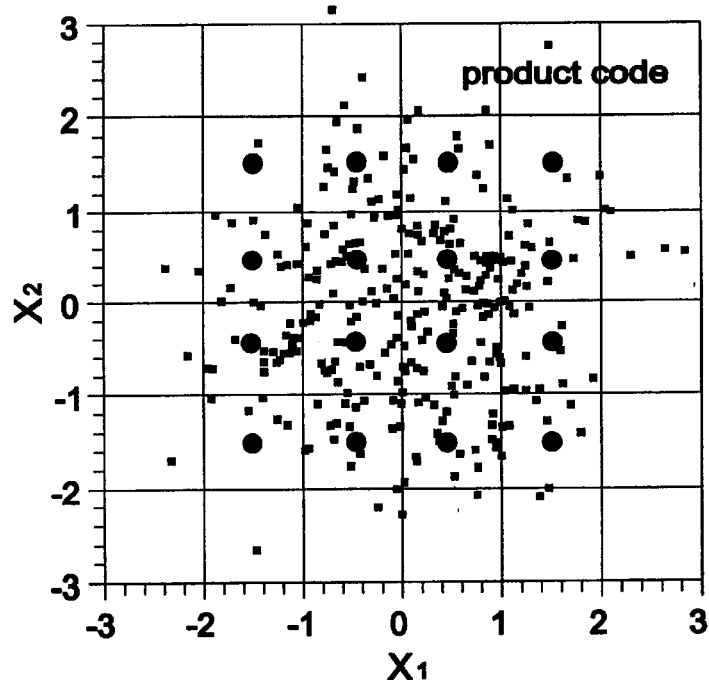
FIG. 16 is a graph of product codes of IICS with the parameters v=4, m=2 and bit rate 2 (the source has Gaussian distribution with variance 1).
Figure 17:
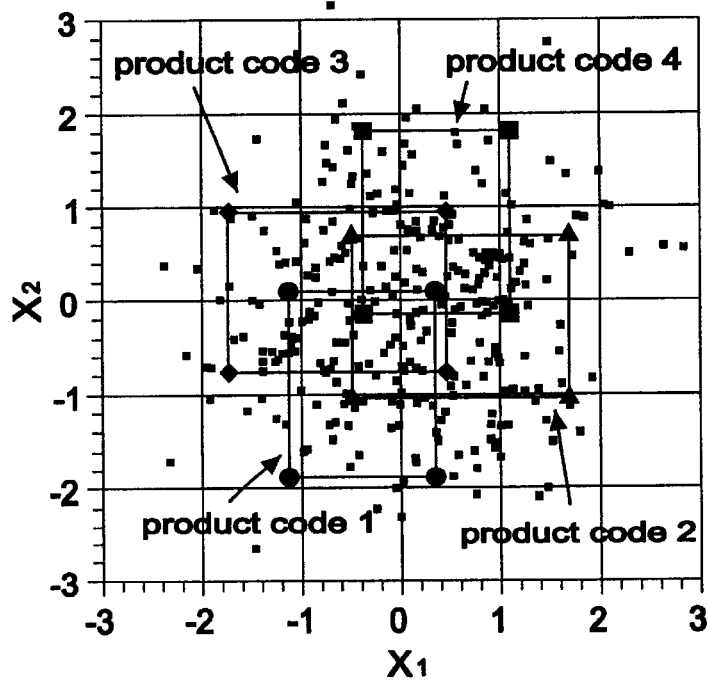
FIG. 17 is a graph of product codes in m-SACS with the parameters m=2, n=2, η=2, at the bit rate 2 (the source has a Gaussian distribution with variance 1).

For understanding the principle of SACS, the product codes of IICS and m-SACS are comparatively illustrated in FIGS. 16 and 17, respectively. In the IICS case, since the 16 (=v$^m$) codewords in 2-dimensional space are the elements of the product code $C_v \times C_v$, the Voronoi regions are rectangular as shown in FIG. 16. On the other hand, the sub-product codes in the m-SACS case can include the IICS case and further, can make non-rectangular Voronoi regions, which yield lower distortion than the IICS case, as shown in FIG. 17.

Figure 18:
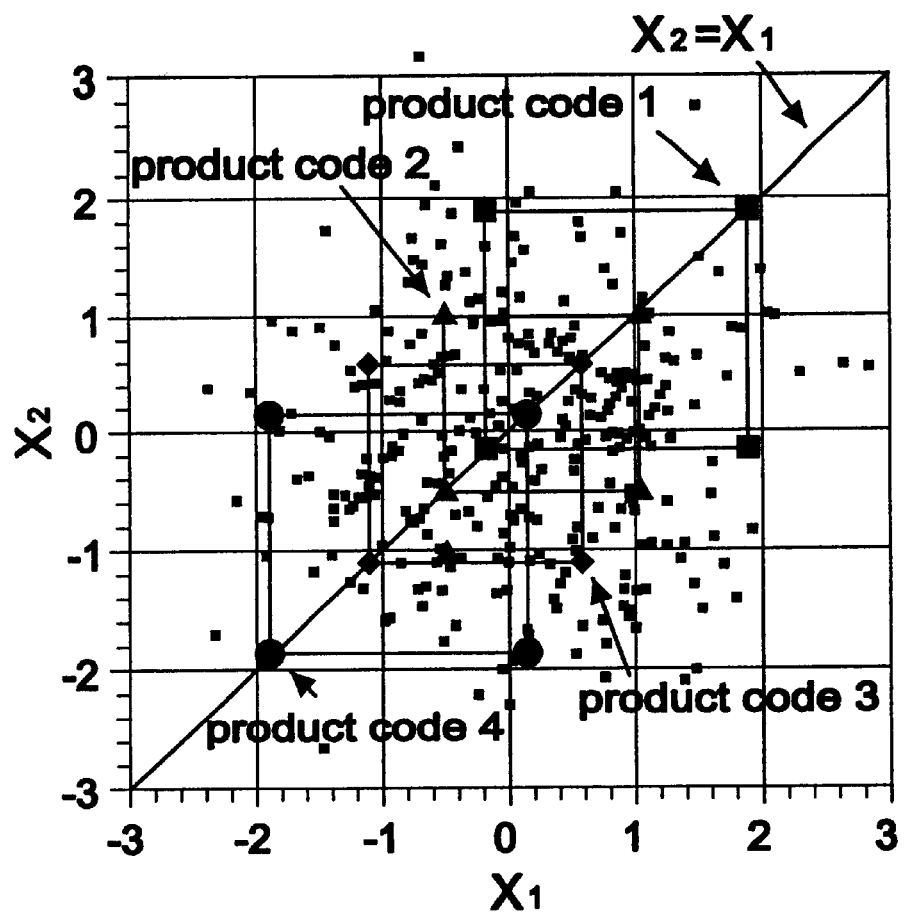
FIG. 18 is a graph of product codes of 1-SACS with the parameters m=2, n=2, η=2, at bit rate 2 and a Signal-to-Noise Ratio (SNR) of 8.75 dB (the source has a Gaussian distribution with variance 1).

For the 1-SACS case, all the sub-product codes are symmetric with respect to the line $X_2=X_1$ as shown in FIG. 18. In the examples of FIGS. 16–18, IICS yields 9.30 dB of Signal-to-Noise Ratio (SNR) and m-SACS increases the SNR to 9.56 dB at a bit rate of 2; where SNR is defined by equation (22) as follows:

$$SNR = -10 \log \frac{\text{(Distortion)}}{\sigma^2} \text{(dB)}, \quad (22)$$

and $\sigma^2$ is the variance of $\mathbf{X}_i$. With the appropriate selection of values for n and β, the SNR of 1-SACS exceeds IICS, too.

Figure 19:
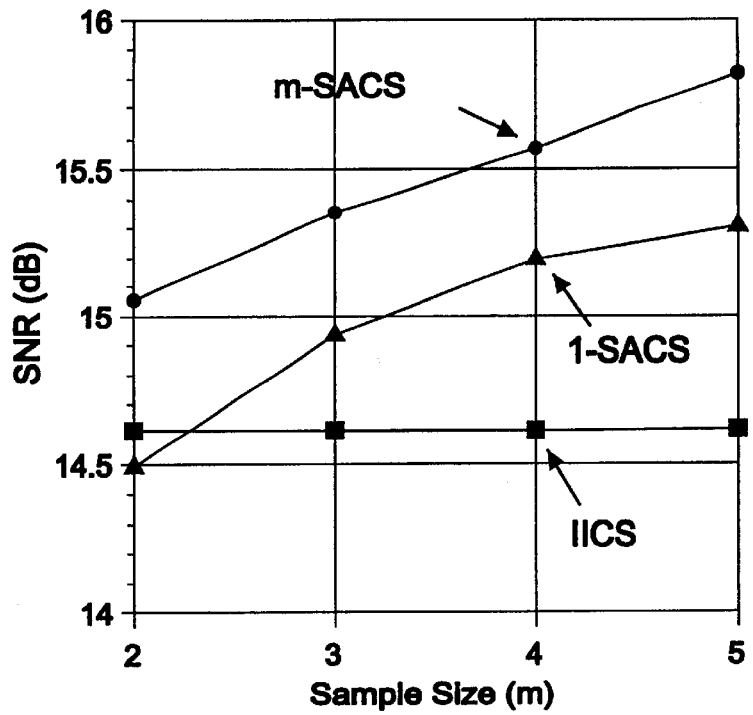
FIG. 19 is a graph of SNR versus sample size m for IICS, m-SACS, and 1-SACS (the source has a Gaussian distribution with variance 1). Common parameters include bit rate 3, k=1, η=m; and specific parameters include v=8 for IICS and n=4 for SACS.

In FIG. 19, for a bit rate of 3, sample-adaptive distortions of m-SACS, 1-SACS, and IICS are compared for increasing values of the sample size m at a fixed value of n=4 (or equivalently for increasing values of the sample ratio β). As expected, m-SACS always yields better results than IICS and 1-SACS. In the m-SACS case, increasing m for a fixed value of n yields more gain over the IICS case, but the gains gradually diminish for larger values of m. Therefore, to obtain gains in 1-SACS for a given bit rate, as large a value for m and n as possible should be used, while keeping the sample ratio β (m/n) small (note that since increasing n increases the total bit rate, indicating that for a given bit rate the side information η should be accordingly decreased).

Figure 20:
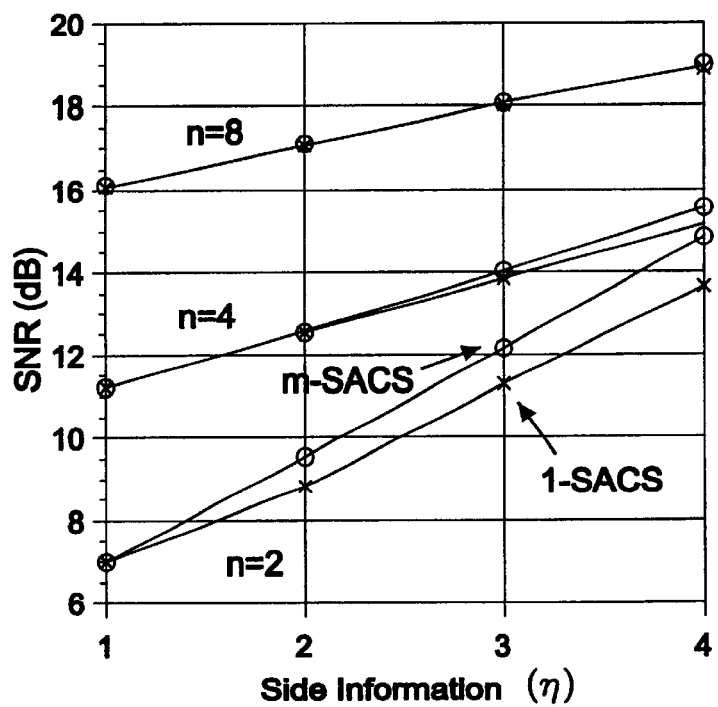
FIG. 20 is a graph of SNR of m-SACS and 1-SACS for different values of η (the source has a Gaussian distribution with variance 1 and β=1).

FIG. 20 illustrates that the SNR of 1-SACS (represented by the "x" data point symbols) is nearly the same as that of m-SACS (represented by the hollow circle data point symbols), especially for larger values of n. It has been found through simulations that for fixed values of β and bit rate that each of the m codes in m-SACS approach a single code as n is increased (i.e., become equal to one another). Therefore, for a relatively large n (compared to η) and a fixed value of β, the performance of 1-SACS is expected to closely approximate that of m-SACS. As a result, the memory savings of 1-SACS relative to m-SACS that may be desirable for certain applications of the present invention may be enjoyed without a significant performance compromise.

Figure 21:
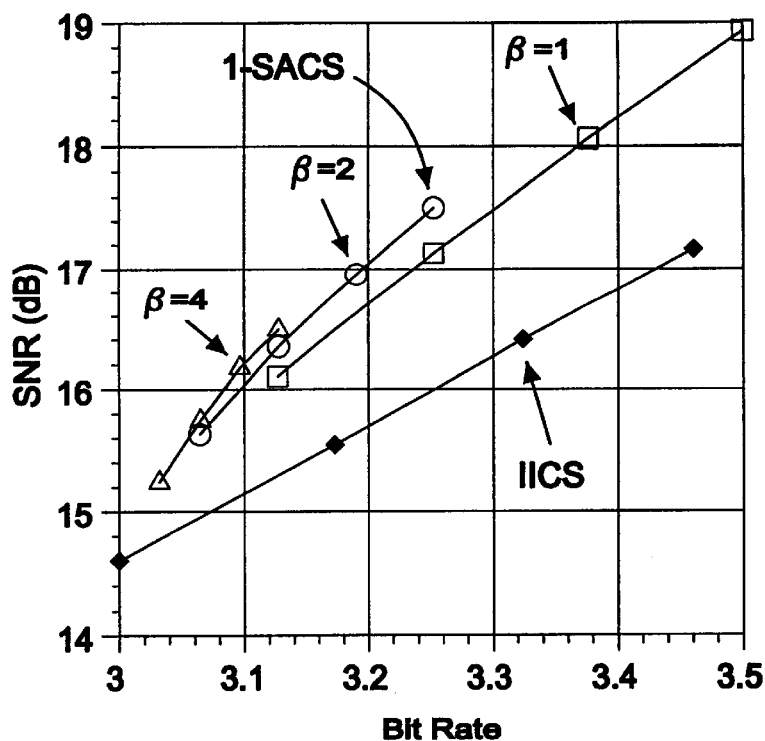
FIGS. 21 and 22 are graphs comparing 1-SACS and IICS scalar quantizations of a Gaussian i.i.d. source. For FIG. 21, n=8. For FIG. 22, n=16.
Figure 22:
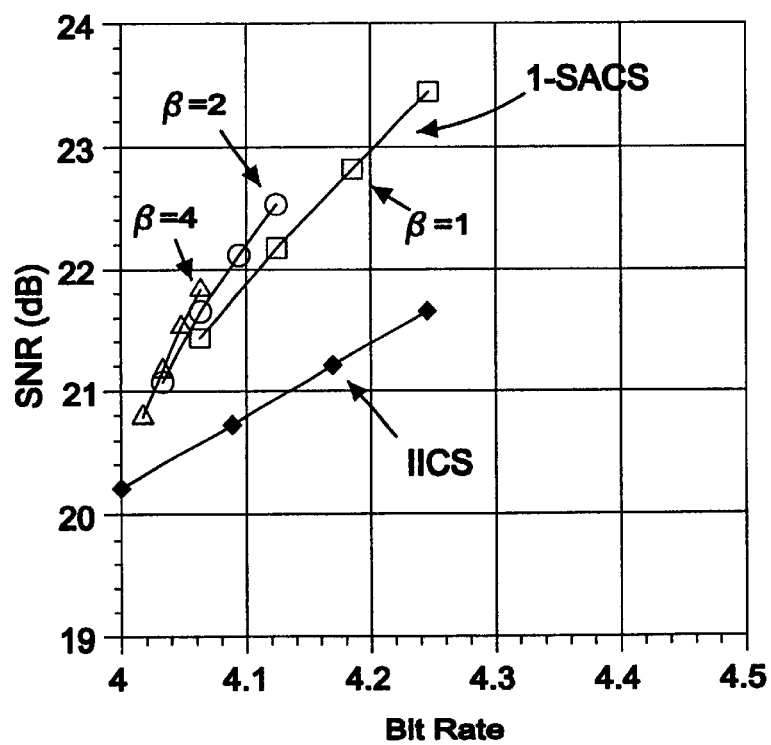

FIGS. 21 and 22 depict the results obtained by simulations for the scalar quantization case (k=1) using the Gaussian i.i.d. source to compare 1-SACS (represented by hollow data point symbols) with IICS (represented by solid data point symbols). For FIGS. 21 and 22, SNR versus the bit rate is plotted for n=8, and n=16, respectively. In each case, curves for η=1, . . . ,4 are established to compare the performance of 1-SACS to IICS, i.e. the Lloyd-Max quantizers. As FIGS. 21 and 22 illustrate, 1-SACS may be configured to significantly outperform IICS. For example, for β=1 and η=4 in FIG. 22 (at a bit rate of 4.25), the SNR curve of 1-SACS shows a 1.8 dB improvement over the SNR curve of IICS.

Figure 23:
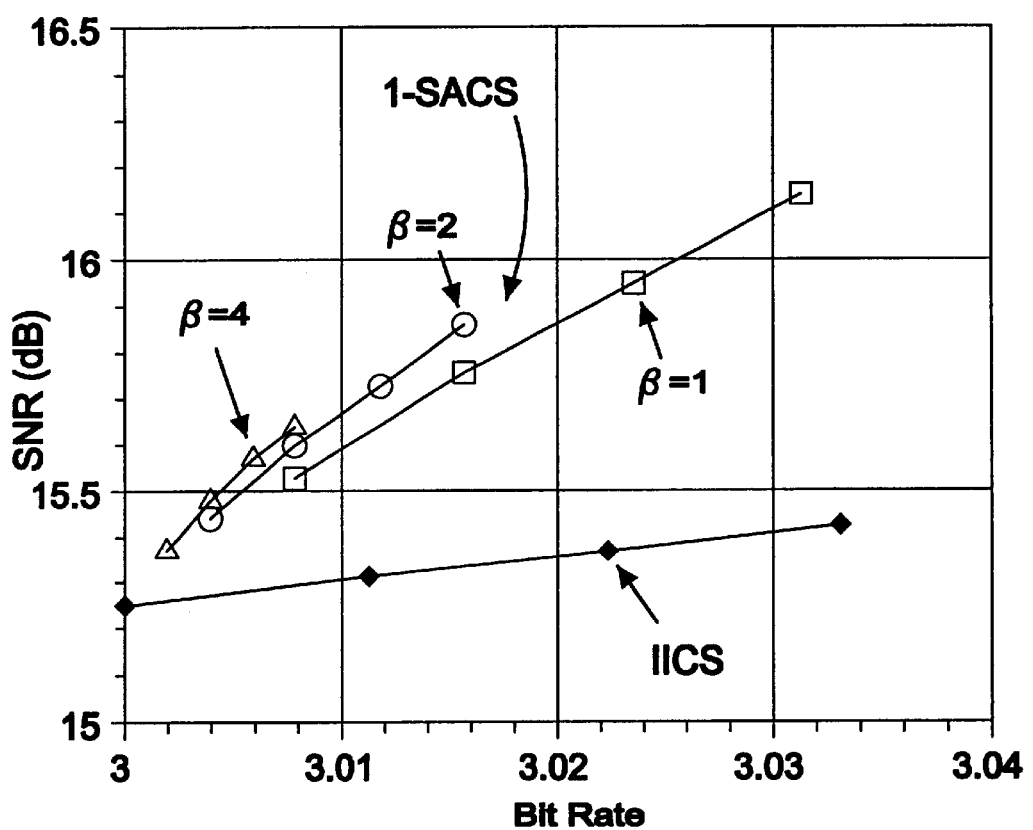
FIG. 23 is a graph comparing 1-SACS and VQ quantizations of a Gaussian i.i.d. source.

In FIG. 23, the performance benefits of using 1-SACS (represented by hollow data point symbols) is also demonstrated relative to the VQ IICS case (represented by solid data point symbols), with k=2. As before, 1-SACS obtains higher SNR than the VQ case. As illustrated by FIGS. 21–23, increasing η provides a greater improvement in the 1-SACS quantizer performance than is obtained by increasing the code size n. In other words, the sample-adaptive distortion curve for each sample ratio β always shows a higher slope than the F-optimal distortion case.

Referring to FIG. 21, selected aspects of the encoding complexity of SACS are illustrated. For the β=1 case and a bit rate of 3.125, an SNR of 16.1 dB results. At this bit rate, a similar performance may be achieved (actually an SNR of 16.0 dB at the bit rate of 3.124, i.e., the code size 76) using vector quantization (VQ) with vector dimension k=2. For SACS, the required number of additions and multiplications per symbol are 33.1 and 16, respectively. However, the VQ case requires 114 additions and 76 multiplications—corresponding to a complexity that is substantially greater than SACS. Note also that the complexity in the VQ case increases faster than SACS as the bit rate increases. For 1-SACs, if the distance measures are stored in a digital lookup table, a total of 4096 bits is required when the word length b=8, while VQ requires 1,048,576 bits. Further, 1-SACS requires 16 words of memory for the codes while VQ requires 64 words.

Experimental results concerning initial code design for SACS are next described. FIGS. 24 and 25 provide tables II and III, respectively, which present information regarding initial code design in accordance with processes 300 and 400 for the scalar quantization case. In table II of FIG. 25, the designed codes (after convergence of the code design process 300) for the η=1 case are compared with the code of the Lloyd-Max quantizer. As can be seen in table II, the two designed codes for each β have shifted form from that of the Lloyd-Max quantizer.

As described for the initial code determination process 400, the codes in the ith code class (for each β) are obtained by adding or subtracting the split constant $\in'$ to codes in the (i−1)st code class that has half the codes of the ith code class. In table III, the initial code of Code 1 is obtained by subtracting $\in'$ from each element and the initial Code 2 is obtained by adding $\in'$ to each element of the Lloyd-Max code. Even the converged values of the codes are such that each element of Code 1 (Code 2) is larger (smaller) than the corresponding element in the Lloyd Max code.

Another initial code was designed by changing the addition or subtraction pattern of $\in'$ relative to the process 400 pattern. For example, in Table III, two different variations are introduced. Note that both Variation 1 and Variation 2 show the same local minimum distortion. However, this value of distortion is slightly larger than the local minimum obtained for the same β=1 case in Table II. Variation 1 in Table III requires a much smaller number of iterations (35 iterations) compared to Variation 2 in Table III (135 iterations). However, the β=1 case of Table II using process 400 requires only 27 iterations.

As used herein, it should be appreciated that: "variable," "criterion," "characteristic," "property," "quantity," "amount," "value," "buffer," "constant," "flag," "data," "record," "memory space," "memory location," "threshold," "input," "output," "pixel," "image" (or a region thereof), "matrix," "command," "look-up table," or "memory location" each generally correspond to one or more signals within processing equipment of the present invention.

It is contemplated that various aspects, features, operators, operations, stages, conditionals, procedures, thresholds, techniques, and processes described in connection with the present invention could be altered, rearranged, substituted, deleted, duplicated, combined, or added to other processes, features, or techniques as would occur to those skilled in the art without departing from the spirit of the present invention.

Commonly owned Provisional Application serial No. 60/070,730, filed 8 Jan. 1998, the benefit of which is claimed herein, is hereby incorporated by reference in its entirety. Furthermore, all U.S. patents and patent applications cited herein are hereby incorporated by reference as if each individual, U.S. patent or patent application were specifically and individually indicated to be incorporated by reference and set-forth herein in its entirety. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention as defined by the following claims are desired to be protected.

What is claimed is:

1. A method of encoding an audio or image signal, comprising:

operating a communication system including an audio or image input device and an encoder;

providing several ordered vectors for encoding by the encoder;

quantizing said vectors with a first ordered group of codebooks to generate a first ordered set of codewords representative of said vectors;

quantizing said vectors with a second ordered group of codebooks to generate a second ordered set of codewords representative of said vectors;

evaluating said first and second ordered codeword sets by determining a corresponding performance characteristic for each set; and selecting one of the ordered codeword sets to encode the vectors based on said evaluating.

2. The method of claim 1 wherein said evaluating includes calculating the performance characteristic for each of the codeword sets as a function of a number of codewords in a corresponding one of the codeword sets.

3. The method of claim 1 wherein the performance characteristic corresponds to a measure of distortion.

4. The method of claim 1 wherein the communication system includes a decoder and defines a communication channel between the encoder and the decoder, and further comprising:

transmitting data corresponding to the one of the codeword sets with the encoder over a channel to a decoder; and decoding the data with the decoder to provide at least one signal representative of the vectors.

5. The method of claim 1 wherein the data includes a value representing one of the codebooks used to generate the one of the codeword sets corresponding to the data.

6. The method of claim 1 wherein said quantizing includes applying the different codebooks in a number of different sequences relative to a predetermined order of the vectors.

7. The method of claim 1 wherein the performance characteristic for each of the codeword sets corresponds to the equation:

$$\frac{1}{m}\sum_{i=1}^{m}\left\|X_i^{\omega} - Q_{C_n^i}(X_i^{\omega})\right\|^r.$$

where: $X^{\omega}_i$ represents the vectors, m represents the number of vectors, $Q_{C_n}$ represents the quantization function using code $C_n$ belonging to the class of n-level codes having a real value in a vector space of the vectors, r is the rth power of the $\mathscr{L}^2$ norm function, and i is a summation index.

8. The method of claim 1 wherein the encoder is provided by a single integrated circuit chip.

9. A method of encoding an audio or image signal, comprising:

operating a communication system including an audio or image input device and an encoder;

providing an ordered group of vectors to the encoder for quantizing sequentially;

generating a number of ordered codeword sets each representative of the same group of vectors, the codeword sets each corresponding to a vector quantization using a different sequential arrangement of codebooks relative to the order of the vectors in the group;

evaluating each of the ordered codeword sets by determining a corresponding performance characteristic for each set; and selecting one of the ordered codeword sets to encode the group based on said evaluating.

10. The method of claim 9 wherein the performance characteristic corresponds to a measure of distortion.

11. The method of claim 9 wherein the communication system includes a decoder coupled to the encoder by a communication channel, and further comprising:

transmitting data corresponding to the one of the codeword sets with the encoder over the channel to the decoder of the communication system; and decoding the data to provide at least one signal representative of the vectors.

12. The method of claim 9 wherein the data includes a value representing one of the codebooks used to generate the one of the codeword sets corresponding to the data.

13. The method of claim 9 wherein the different codebooks number at least four.

14. The method of claim 9 wherein the encoder is provided by a single integrated circuit chip.

15. A method of encoding an audio or image signal, comprising:

providing a communication system including an audio or image input device and an encoder with a number of different codebooks;

establishing an ordered group of vectors based on an audio or image input;

quantizing each of the vectors of the ordered group using respective codebooks from first and second ordered groups of codebooks to provide first and second ordered codeword sets each representative of the group of vectors;

evaluating distortion of each of the first and second ordered codeword sets; and selecting the ordered codeword set having less distortion than any other of the codeword sets to encode the group of vectors with the encoder.

16. The method of claim 15 wherein said evaluating includes determining a performance characteristic for each of the codeword sets.

17. The method of claim 15 wherein said evaluating includes calculating the performance characteristic for each of the codeword sets as a function of a number of codewords in a corresponding one of the codeword sets.

18. The method of claim 15 further comprising:

transmitting data corresponding to the one of the codeword sets with the encoder over a channel to a decoder of the communication system; and decoding the data with the decoder to provide at least one signal representative of the vectors.

19. The method of claim 15 wherein the data includes a value representing one of the codebooks used to generate the one of the codeword sets corresponding to the data.

20. The method of claim 15 further comprising empirically determining a property of the vectors corresponding to a distribution function.

21. The method of claim 15 wherein said quantizing includes applying the different codebooks in a number of different sequences relative to a predetermined order of the vectors.

22. The method of claim 15 wherein the encoder is provided by a single integrated circuit chip.

23. A communication system, comprising:

an audio or image input device;

an encoder coupled to said input device;

a decoder coupled to said encoder by a communication channel; and an audio or image output device coupled to said decoder, wherein said encoder includes:

a number of different ordered groups of codebooks;

a number of quantizers each configured to receive a common set of vectors for quantization with a different one of said ordered groups of codebooks to provide a corresponding ordered codeword set representative of said set of vectors, said quantizers each providing a perfomance signal characterizing distortion of said corresponding codeword set;

a comparator responsive to said performance signals to generate a selection signal corresponding to a selected one of said quantizers providing said corresponding codeword set with lowest distortion; and a multiplexor responsive to said selection signal to transmit data to said decoder along said communication channel representative of said corresponding codeword set for said selected one of said quantizers.

24. The apparatus of claim 23 wherein said performance signals each correspond to a measure of distortion of said corresponding codeword set.

25. The apparatus of claim 23 wherein each of said quantizers provides a different sequential arrangement of said codebooks relative to a predetermined order of said vectors.

26. A sample-adaptive product quantizer, comprising:

an audio or image input device adapted to convert an input signal to vector data; and an encoder having an input configured to receive vector data from said input device and an output for transmitting codeword indices and a codebook group index corresponding to said vector data, said encoder including a number of different codebooks and defining first and second ordered groups thereof, said encoder being responsive to said vector data to define a group of vectors from said vector data and quantize each of said vectors of said group using respective codebooks from said first and second ordered groups to provide first and second ordered codeword sets each representative of said group of vectors, said encoder being configured to calculate distortion of each of said ordered codeword sets and provide codeword indices to said output corresponding to the codewords in the codeword set having less distortion than any other codeword set, said encoder being further configured to provide an index for the ordered group of codebooks corresponding to the codeword set having less distortion than any other codeword set.

27. The system of claim 26 further comprising:

a communication channel coupled to said output of said encoder to receive said encoded data; and a decoder coupled to said communication channel responsive to said encoded data to decode said encoded data and output at least one signal representative of said vectors.

28. The system of claim 27 wherein said decoder includes said different codebooks.

29. The system of claim 26 wherein said encoder is configured to empirically determine a property of said vectors of said group corresponding to a distribution function.

30. The system of claim 26 wherein said codeword sets each correspond to a different sequential arrangement of said codebooks relative to a predetermined order of said vectors of said group.

31. The system of claim 26 wherein said encoder is provided by a single integrated circuit.

32. The system of claim 26 wherein said codebooks number at least as many as said vectors.

* * * * *

UNITED STATES PATENT AND TRADEMARK OFFICE
CERTIFICATE OF CORRECTION

PATENT NO. : 6,826,524 B1
APPLICATION NO. : 09/612579
DATED : November 30, 2004
INVENTOR(S) : Dong Sik Kim It is certified that error appears in the above-identified patent and that said Letters Patent is hereby corrected as shown below:

Please correct the title to read as follows: --SAMPLE-ADAPTIVE PRODUCT QUANTIZATION METHOD AND SYSTEM--.

In the References Cited, after "5,398,069" please change "3/1995" to --4/1995--.
In the References Cited, after "5,745,504" please change "Bangng" to --Bang--.

In column 5, line 2, please change "$\mathbf{R}_i$" to --$\mathbf{X}_i$--.
In column 5, line 3, please change "$\mathbf{R}_i$" to --$\mathbf{X}_i$--.
In column 5, line 66, please change "$_{1\text{-}1}$" to --$_{i=1}$--.
In column 12, line 12, please change "(d.f)" to --(d.f.)--.

In column 15, line 56, please replace the equation as follows: -- $\bigcup_{j=1}^{2\eta} \left( X_{i=1}^{m} \Lambda^{i,j} \right)$ --.

In column 16, please replace equation (12) as follows: -- $A_1 \cong A_1^\perp \cong \mathbf{Z}$ where $A_2 \left( \cong A_2^\perp \right)$ --.

In column 16, line 25, please change "u2=(1,0,-1)" to -- $u2=(1,0,-1)^T$ --
In column 17, please delete line 30 and replace as follows: -- $D_m^\perp \in L_m^1$ --.
In column 20, line 34, please change "$REC_i$" to -- $REC'_i$ --.

Signed and Sealed this

Twenty-second Day of May, 2007

JON W. DUDAS
*Director of the United States Patent and Trademark Office*